2,943,087

DERIVATIVES OF 4-OXO-2,3-DIHYDRO-(BENZO-1,3-OXAZINES)

Gerhard Ohnacker and Heinz Scheffler, Biberach an der Riss, Germany, assignors to Dr. Karl Thomae G.m.b.H., Biberach an der Riss, Germany, a corporation of Germany No Drawing. Filed Nov. 14, 1957, Ser. No. 696,571
Claims priority, application Germany Nov. 14, 1956
11 Claims. (Cl. 260—244)

This is a continuation-in-part of copending application S.N. 626,584, filed December 6, 1956, now abandoned.

This invention relates to novel derivatives of 4-oxo-2,3-dihydro-(benzo-1,3-oxazines) having the general structural formula

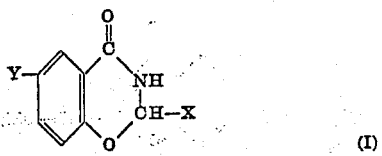
(I)

wherein Y is hydrogen, halogen, lower alkanoyl, lower halo-alkanoyl, lower phenyl-alkanoyl or benzoyl, and X is mono-halo-alkyl with 1 to 6 carbon atoms or a radical of the formula

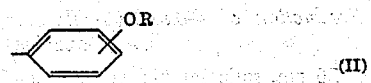
(II)

wherein R is lower halo-alkyl, lower alkoxy-lower alkyl or lower alkenyl.

Various 2-substituted 4-oxo-2,3-dihydro-(benzo-1,3-oxazines) have been described in the prior art. Kaufmann in Arch. Pharm., vol. 265, pages 226–238 (1927), described a 2-substituted 4-oxo-2,3-dihydro-(benzo-1,3-oxazine) having the structural formula

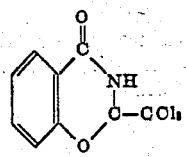

Similarly, Horrom et al. in J. Am. Chem. Soc., vol. 72, page 721 (1950), described various phenyl derivatives of this particular class of compounds having the structural formula

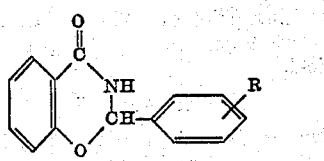

wherein R is hydrogen or methoxy.

The compounds described in the prior art have either no pharmacological activity (Kaufmann) or only very limited therapeutic utility, that is analgesic activity in dogs and hypnotic activity in mice (Horrom et al.).

We have now discovered that the compounds disclosed herein having the structural Formula I above, exhibit very high analgesic antipyretic and antiphlogistic properties in animals as well as in humans. For therapeutic purposes the compounds according to the present invention may be administered in the form of tablets, lozenges, suppositories, solutions or emulsions. The optimum effective dosage range for human adults is generally between 200 and 600 mgm.; for peroral administration a dosage of 400 to 500 mgm. is sufficient, while for rectal administration a somewhat lesser dosage is recommended. Moreover, for analgesic antipyretic and/or antiphlogistic therapy the above-described novel compounds may be administered either alone or in combination with agents customarily used in conjunction with antipyretics or antiphlogistics, for example in combination with caffeine and phenacetin or with barbiturates.

The compounds according to the present invention may be produced in accordance with the following methods.

(a) By condensation of salicylamide, a 5-halo-substituted salicylamide or a 5-acylated salicylamide with an aldehyde of the formula

wherein X is a halo-alkyl radical with 1 to 6 carbon atoms or a radical of the formula II above, in accordance with known methods (see, for example, Horrom et al., supra, pages 722–724). The condensation may, for example, be carried out in boiling chloroform or benzene accompanied by azeotropic removal of the water of condensation, and in the presence of concentrated sulfuric acid or in ethanol in the presence of a hydrogen halide as the condensation agent. The condensation may, however, also be carried out in the presence of weak acids, preferably of benzene- or toluene-sulfonic acids or phosphoric acid, accompanied by azeotropic removal of the water of condensation with suitable inert entrainment agents, such as benzene or chloroform.

(b) By condensation of salicylamide, a 5-halo-substituted salicylamide or 5-acylated salicylamide with acetals corresponding to the aldehydes mentioned under (a) above except those in which X represents the substituted phenyl radical, in the presence of a suitable condensation agent, such as hydrogen halides or concentrated sulfuric acid, and preferably in the presence of an alcohol-binding compound, such as glacial acetic acid. It is advantageous to carry out this condensation reaction in an inert solvent medium such as chloroform.

(c) By condensation of salicylamide, a 5-halo-substituted salicylamide of a 5-acylated-salicylamide with a β-alkoxy-substituted aldehyde of the formula

wherein $R_1$ is a lower alkyl radical and A is an alkylene radical with 2 to 6 carbon atoms or an α,β-unsaturated alkenyl radical with 2 to 6 carbon atoms, in the presence of a suitable inert solvent, such as chloroform, and in the presence of a hydrogen halide.

(d) By condensation of salicylamide, a 5-halo-substituted salicylamide or a 5-acyl-substituted salicylamide with a β-alkoxy-substituted aldehyde having the formula indicated under (c) above, or acetals thereof, in the presence of a hydrogen halide and preferably in the presence of an alcohol-binding agent, such as glacial acetic acid. For this condensation reaction it is also advantageous to operate in a suitable inert solvent medium, such as chloroform.

(e) By condensation of salicylamide, a 5-halo-substituted salicylamide or a 5-acyl substituted salicylamide with a 2-alkene-1-al having 2 to 6 carbon atoms in the alkenyl radical, in the presence of a hydrogen halide gas, preferably HBr or HCl, using water and/or an inorganic or organic acid, such as formic acid, propionic acid or their homologs, as a solvent or in the presence of a concentrated or dilute hydrogen halide acid, preferably hydrochloric or hydrobromic acid, at a temperature of 50° C. or below. The reaction mixture obtained thereby is worked up in the usual manner. Conveniently, the liquid reaction product is poured into water and the precipitated raw product is recrystallized from ethanol or methanol.

(f) Compounds having the structural Formula I above wherein X is an iodo-substituted radical may also be obtained by subjecting the corresponding bromo- or chloro-substituted compounds to a halogen exchange reaction with an alkali metal iodide in accordance with well known methods.

The acetals mentioned under (b) above need not be present in pure, isolated form; instead, the condensation reaction may also be carried out in the medium in which the acetals were formed without further isolation and purification of the acetals. For example, if the acetal reactant is to be a β-halo-propionaldehyde-acetal it may be produced according to known methods by adding acrolein dropwisely to a solution of a alkanol, such as methanol, ethanol, propanol, isopropanol and the like, in a suitable solvent, such as chloroform, saturated with a hydrogen halide, and the raw product obtained thereby may be directly reacted with the salicylamide compound as described under (b) above. Based on the starting materials for the acetal production, this method produces better yields of the desired product than when previously isolated and purified acetals are used as the starting material.

The compounds according to the present invention are new and valuable therapeutic agents with excellent analgesic, antipyretic and antiphlogistic properties, as previously pointed out. Among the heretofore known 2-substituted 4-oxo-2,3-dihydro-(benzo-1,3-oxazines) only 4-oxo-2-phenyl-2,3-dihydro-1,3-oxazines) was found to have an analgesic effect equivalent to salicylamide. In contrast thereto, the compounds disclosed herein are surprisingly, considerably more effective as analgesics than salicylamide and, furthermore, possess antipyretic and antiphlogistic properties far superior to salicylamide.

The following examples will further illustrate the present invention without, however, limiting the same to these particular examples.

EXAMPLE 1

*Production of 4-oxo-2-(β-chloroethyl)-2,3-dihydro-(benzo-1,3-oxazine)*

15 gm. salicylamide were dehydrated azeotropically with 200 cc. absolute benzene and 1 gm. p-toluenesulfonic acid using a water trap. To the resulting suspension a solution of 10.2 gm. freshly produced β-chloro-propionaldehyde in 10 cc. benzene was added dropwisely and the mixture was heated to the boiling point. After about 4 hours, 1.3 cc. water had collected in the water trap. Thereafter, the benzene was distilled off, the residue was dissolved in chloroform, extracted with a 5% sodium hydroxide solution, washed with water until neutral, and finally dried over calcium chloride. After removing the chloroform an oily residue was obtained which solidified after standing for about one day. The solid product was then recrystallized from ethanol. The yield was 5 gm., which corresponds to 20% of the theoretical yield. The melting point of the recrystallized product was 146–147° C. (decomposition). Its empirical formula was found to be $C_{10}H_{10}NO_2Cl$ (211.64) and analysis showed the following composition:

|   | C | H | O | N | Cl |
| --- | --- | --- | --- | --- | --- |
|   | Percent | Percent | Percent | Percent | Percent |
| Calculated | 56.75 | 4.76 | 15.12 | 6.62 | 16.76 |
| Found | 56.50 | 4.76 | 15.35 | 6.41 | 16.48 |

Its structural formula was

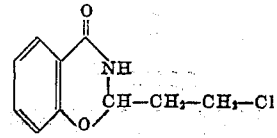

EXAMPLE 2

*Production of 4-oxo-2-(β-bromoethyl)-2,3-dihydro-(benzo-1,3-oxazine)*

A mixture of 42.2 gm. β-bromo-propionaldehyde, 27.4 gm. salicylamide, 24 gm. glacial acetic acid and 150 cc. chloroform was heated on a water bath under reflux for about ½ hour while passing hydrogen chloride gas through the mixture. The clear solution obtained thereby was repeatedly extracted with a 5% sodium hydroxide solution, washed with water until neutral and finally dried over calcium chloride. After removing the solvent a solid residue was obtained which was recrystallized from 50% ethanol. The recrystallized product had the structural formula

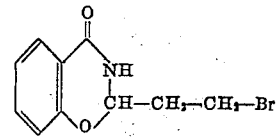

with a melting point of 120–121° C. (decomposition). The yield was 17 gm., corresponding to 34% of the theoretical yield.

EXAMPLE 3

*Production of 4-oxo-2-(β-chloroethyl)-2,3-dihydro-(benzo-1,3-oxazine)*

20 gm. salicylamide were suspended in 100 cc. chloroform and 15.3 gm. β-ethoxy-propionaldehyde were added to the suspension. The resulting mixture was then heated to 50° C. and hydrogen chloride gas was introduced for about 10 minutes. The reaction mixture was then allowed to stand at room temperature for about one day, whereupon it was extracted with a 5% sodium hydroxide solution, washed with water until neutral and finally dried over calcium chloride. Thereafter, the chloroform solvent was removed, leaving a solid residue, which was recrystallized from ethanol. The recrystallized product had the structural formula

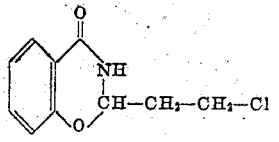

with a melting point of 146–147° C. (decomposition). The yield was 9 gm., corresponding to 29% of the theoretical yield.

EXAMPLE 4

*Production of 4-oxo-2-(β-chloroethyl)-2,3-dihydro-(benzo-1,3-oxazine)*

15.3 gm. β-ethoxy-propionaldehyde were suspended in 100 cc. chloroform and hydrogen chloride gas was passed through the resulting suspension for about 5 minutes. Thereafter, 20 gm. salicylamide and 9 cc. glacial acetic acid were added to the reaction mixture, whereby a clear solution was obtained. The solution was heated for one hour under reflux while passing hydrogen chloride gas therethrough. The chloroform was then evaporated in vacuo and the residue was admixed with 200 cc. water. A precipitate was formed which was separated by vacuum filtration, triturated with a 5% solution of sodium hydroxide, washed with water until neutral and recrystallized from ethanol. The recrystallized product had the structural formula

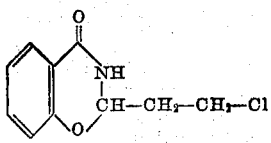

with a melting point of 146–147° C. (decomposition). The yield was 21 gm., which corresponds to 68% of the theoretical yield.

EXAMPLE 5

*Production of 4-oxo-2-(β-chloroethyl)-2,3-dihydro-(benzo-1,3-oxazine)*

17.6 gm. β-ethoxy-propionaldehyde-diethyl-acetal, 13.7 gm. salicylamide and 18 gm. glacial acetic acid were added to 150 cc. chloroform and the mixture was heated for one hour at the boiling point while passing hydrogen chloride gas through it. The chloroform was then removed by vacuum distillation and the solid residue was worked up as described in Example 4. After recrystallization from ethanol, the product was found to have the structural formula

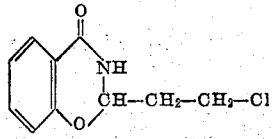

and a melting point of 146–147° C. (decomposition). The yield was 14.5 gm., corresponding to 71% of the theoretical yield.

EXAMPLE 6

*Preparation of 4-oxo-2-(β-chloroethyl)-2,3-dihydro-(benzo-1,3-oxazine)*

A mixture of 16 gm. β-chloro-propionaldehyde-diethylacetal, 13.7 gm. salicylamide and 12 cc. glacial acetic acid was admixed with 150 cc. chloroform. The resulting mixture was heated to 50° C. while stirring, and then hydrogen chloride gas was passed through it for 1¼ hours. Thereafter, the chloroform solvent was distilled off in vacuo and the solid residue was worked up as described in Example 4. The reaction product was recrystallized from ethanol. It had the structural formula

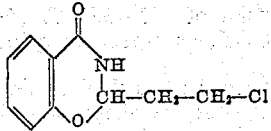

and a melting point of 146–147° C. (decomposition). The yield was 14.5 gm., corresponding to 68.5% of the theoretical yield.

EXAMPLE 7

*Production of 4-oxo-2-(β-chloroethyl)-2,3-dihydro-(benzo-1,3-oxazine)*

Hydrogen chloride gas was passed into 200 cc. glacial acetic acid for 5 minutes, and 40 gm. salicylamide and 30.6 gm. β-ethoxy-propionaldehyde were added to the solution. The resulting reaction mixture was heated to 60° C. for about ½ hour and then allowed to stand at room temperature for about five days. Thereafter, the reaction mixture was poured into 2 liters of water. A crystalline precipitate was formed which was separated by vacuum filtration and worked up as described in Example 4, and finally recrystallized from ethanol. The product had the structural formula

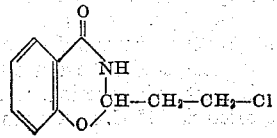

with a melting point of 146–147° C. (decomposition). The yield was 41 gm., corresponding to 65% of the theoretical yield.

EXAMPLE 8

*Production of 4-oxo-2-(β-chloroethyl)-2,3-dihydro-(benzo-1,3-oxazine)*

A mixture of 4 liters chloroform and 1050 cc. ethanol was saturated with dry hydrogen chloride gas at −5 to +5° C. in a vessel having a net volume of 15 liters and provided with a stirring device, reflux cooler, gas feed line, thermometer and dropping funnel. 455 gm. acrolein which had been precooled to 0° C. were added dropwisely to the solution over a period of 1 to 2 hours while maintaining the temperature below +5° C. and vigorously stirring. 1070 gm. salicylamide and 1080 gm. glacial acetic acid were added to the resulting solution of β-chloro-propionaldehydeacetal, thereby forming a suspension which was heated to 60° C. while stirring. A clear solution was formed which was maintained at 60° C. for an additional hour. The solution was allowed to cool to about 40° C. and was then washed with water by passing a strong stream of water under the surface of the chloroform and continuously withdrawing the upper phase. When the water had reached a pH of 3–4, the precipitated reaction product was separated by vacuum filtration. The chloroform phase of the filtrate was evaporated under a weak vacuum and the residue was combined with the precipitate first obtained. The combined products were stirred with 2 liters of a 5% sodium hydroxide solution. The raw reaction product was then washed with water, dried and recrystallized from ethanol. The product had the structural formula

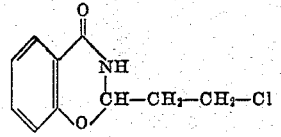

with a melting point of 146–147° C. (decomposition). The yield was 1250 gm., corresponding to 76% of the theoretical yield.

EXAMPLE 9

*Production of 4-oxo-6-bromo-2-(β-chloroethyl)-2,3-dihydro-(benzo-1,3-oxazine)*

20 gm. β-chloro-propionaldehyde-diethylacetal, 28.5 gm. 5-bromo-salicylamide and 14.5 gm. glacial acetic acid were suspended in 150 cc. chloroform, and the suspension was heated and refluxed for 2½ hours while passing hydrogen chloride gas therethrough. A clear solution was obtained. The chloroform solvent was separated from the solution by vacuum distillation and the residue was worked up as described in Example 4. The raw reaction product was recrystallized from ethanol. The crystalline product was found to have the structural formula

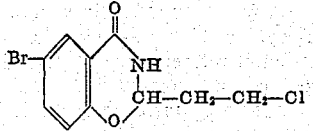

with a melting point of 162–163° C. The yield was 21.4 gm., corresponding to 61% of the theoretical yield.

EXAMPLE 10

*Production of 4-oxo-2-chloromethyl-2,3-dihydro-(benzo-1,3-oxazine)*

27.4 gm. salicylamide and 0.5 gm. p-toluene sulfonic acid suspended in 250 cc. absolute benzene were azeotropically dehydrated in a vessel provided with a stirring device, a dropping funnel, a water trap and a reflux cooler. To this suspension a solution of 16 gm. chloroacetaldehyde in 20 cc. absolute benzene was added dropwisely over a period of about 10 minutes, and the mixture was heated to the boiling point while stirring. After 3 hours, 2.5 cc. water had collected in the water trap. The homogeneous reaction mixture was then concentrated by evaporation and the residue was dissolved in chloroform. The solution was washed with a 5% solution of sodium hydroxide and large quantities of water and finally dried over calcium chloride. The chloroform solvent was then removed, leaving a residue which crystallized after stirring a small amount of methanol into it. The raw product was recrystallized from methanol. The empirical formula of the product was $C_9H_8NO_2Cl$ (197.6) and its melting point was 140–142° C. The nitrogen content was calculated to be 7.11% and actually found to be 7.15%. The yield was 11.5 gm., corresponding to 20% of the theoretical yield.

EXAMPLE 11

*Production of 4-oxo-2-chloromethyl-2,3-dihydro-(benzo-1,3-oxazine)*

46 gm. chloroacetal, 40 gm. salicylamide and 36 gm. glacial acetic acid were suspended in 200 cc. chloroform, and the suspension was heated under reflux for 5 hours while passing hydrogen chloride gas therethrough. The resulting solution was then evaporated until a tacky residue remained, which was admixed with a small amount of methanol, whereupon the residue crystallized. The crystalline product was then admixed with 5% sodium hydroxide solution until a sample of the product did not color an iron chloride solution. Thereafter the mixture was washed with large amounts of water and recrystallized from methanol. The product had the structural formula

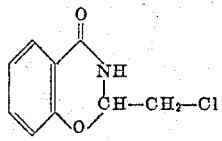

with a melting point of 140–142° C. The yield was 36 gm., corresponding to 63% of the theoretical yield.

EXAMPLE 12

*Production of 4-oxo-6-chloro-2-(β-chloroethyl)-2,3-dihydro-(benzo-1,3-oxazine)*

A solution of 20 cc. absolute ethanol in 150 cc. chloroform was saturated with dry hydrogen chloride gas at about −5° C. The resulting solution was admixed with 6.2 gm. acrolein at a temperature below +5° C. and thereafter stirred at room temperature for about ½ hour. 17.1 gm. 5-chloro-salicylamide and 15 gm. glacial acetic acid were added thereto and the resulting mixture was heated under reflux for 6 hours while stirring. Thereafter the solution was evaporated in vacuo. The crystalline reaction product remaining behind was triturated with cold methanol, filtered on a suction filter and then stirred into a small amount of 1 N sodium hydroxide solution to remove unreacted 5-chloro-salicylamide. The product was then washed with water on a vacuum filter until neutral and finally dried. Upon recrystallization from ethanol a white crystalline product was obtained having the structural formula

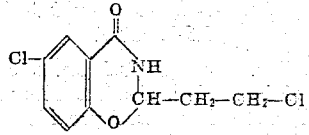

and a melting point of 152–153° C. The yield was 12.7 gm., corresponding to 52% of the theoretical yield.

EXAMPLE 13

*Production of 4-oxo-6-chloro-2-bromomethyl-2,3-dihydro-(benzo-1,3-oxazine)*

150 cc. chloroform were admixed with 17.1 gm. 5-chlorosalicylamide, 18.6 gm. α-bromo-acetaldehyde-dimethylacetal and 15 gm. glacial acetic acid. The resulting mixture was heated under reflux for three hours while passing dry hydrogen chloride through it. After cooling, the solution obtained thereby was evaporated in vacuo and the crystalline residue was triturated with a small amount of methanol. The mixture was filtered on a suction filter and the filter cake was washed with 1 N sodium hydroxide solution to remove unreacted 5-chloro-salicyl-amide. Thereafter the filter cake was washed with water on the suction filter until it was neutral, whereupon the filter cake was dried. The dry product was then recrystallized from ethanol. The crystalline product had the structural formula

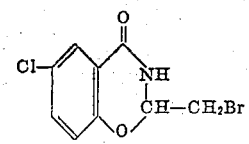

and a melting point of 182–183° C. The yield was 20.3 gm., corresponding to 73.5% of the theoretical yield.

EXAMPLE 14

*Production of 4-oxo-2-(β-iodoethyl)-2,3-dihydro-(benzo-1,3-oxazine)*

(a) 21.1 gm. 4-oxo-2-(β-chloroethyl)-2,3-dihydro-(benzo-1,3-oxazine) admixed with 22.5 gm. sodiumiodide were dissolved in 600 cc. acetone and the solution was heated under reflux for seven hours. The sodium chloride precipitated thereby was filtered off and the acetone was distilled off, leaving a crystalline residue which was recrystallized from methanol. The product had the structural formula

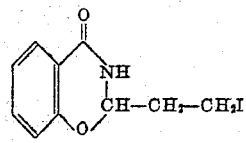

and a melting point of 133–135° C. (decomposition). The yield was 26 gm., corresponding to 86% of the theoretical yield.

(b) The same product was obtained when salicylamide and β-iodo-propionaldehyde-dimethylacetal were reacted in the manner described in Example 5.

EXAMPLE 15

*Production of 4-oxo-2-(β-chloroethyl)-2,3-dihydro-(benzo-1,3-oxazine)*

1.5 kg. hydrogen chloride gas were passed at 5–10° C. into 10 liters glacial acetic acid. To this solution were added 4.11 kg. salicylamide while stirring. Into this solution were introduced during 45 minutes uniformly 2.1 kg. acrolein while simultaneously additional 1.5 kg. hydrogen chloride gas were passed therethrough. During this operation the temperature was allowed to increase in 10 minutes at 45–50° C. and this temperature was maintained during the remaining 35 minutes by external cooling. When the addition of acrolein was completed it was stirred during additional 10 minutes and then the dark brown limpid solution was poured into water at 10–15° C. while vigorously stirring. The raw product crystallized out immediately. It was collected by suction, washed with water to neutrality and dried at 60° C. maximum. Then it was recrystallized from ethanol with addition of charcoal, filtered by suction, washed with ice-cold ethanol and dried at 60° C. maximum. There were obtained 4.94 kg. (78% of the theory) reaction product having the structural formula

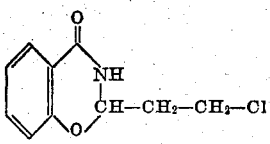

and a melting point of 146–147° C. (decomposition).

EXAMPLE 16

*Production of 4-oxo-2-(β-iodoethyl)-2,3-dihydro-(benzo-1,3-oxazine)*

25.6 gm. 4-oxo-2-(β-bromoethyl)-2,3-dihydro-(benzo-1,3-oxazine) admixed with 25 gm. potassium iodide were dissolved in 650 cc. acetone and the solution was heated under reflux for 22 hours. The potassium bromide precipitated thereby was filtered off and the acetone was distilled off, leaving a crystalline residue which was recrystallized from methanol. The product had the same structural formula as the product obtained in the procedure of Example 14 and a melting point of 134–135° C. (decomposition). The yield was 24.5 gm. corresponding to 81% of the theoretical yield.

EXAMPLE 17

*4 - oxo - 2 - (β-bromoethyl)-2,3-dihydro-[benzo-1,3-oxazine]*

20 gm. hydrogen bromide gas were bubbled into 200 cc. of glacial acetic acid at 5 to 10° C. and thereafter 27.4 gm. salicylamide were added. Into this suspension were introduced during 5 minutes 11.2 gm. acrolein while simultaneously additional hydrogen bromide gas was passed therethrough. During this process the temperature may not extend 50° C. After addition of acrolein the solution was stirred for 30 minutes at 50° C. and then poured into water. The precipitated raw product was washed with water until neutral and recrystallized from ethanol water (1:1). The crystalline product had the structural formula

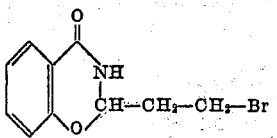

with a melting point of 120–121° C. (decomposition). The yield was 22 gm. corresponding to 76% of the theoretical yield.

EXAMPLE 18

24.3 gm. o-allyloxy-benzaldehyde, 20 gm. salicylamide and 0.5 cc. concentrated sulfuric acid were admixed with 200 cc. absolute chloroform, and the resulting mixture was heated and refluxed, accompanied by stirring. The water liberated by the condensation reaction was separated in a water separator. After two hours the reaction had gone to completion. The reaction solution was first washed with 2 N NaOH and then with water; thereafter it was dried with calcium chloride and finally concentrated by evaporation. A viscous oil remained behind, which crystallized upon scratching it. The crystalline substance was recrystallized from ethanol. 31.2 gm. 4-oxo - 2 - (o - allyloxy-phenyl)-2,3-dihydro-(benzo-1,3-oxazine) were obtained. The product had the structural formula

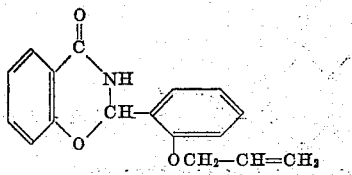

and a melting point of 91–92° C.

EXAMPLE 19

24.3 gm. p-allyloxy-benzaldehyde, 20 gm. salicylamide and 0.5 cc. concentrated sulfuric acid were admixed with 250 cc. absolute benzene, and the resulting mixture was heated and refluxed, accompanied by stirring. The water liberated by the condensation reaction was separated in a water separator. The reaction had gone to completion after three hours. After allowing the reaction mass to cool it was concentrated by evaporation in a vacuum. The greasy residue was caused to crystallize by adding a small amount of cold methanol, and the crystalline mass was sucked off and stirred with a small amount of 2 N NaOH. The crystals were then separated on a vacuum filter, washed with water until neutral and recrystallized from methanol. 34.5 gm. 4-oxo-2-(p-allyloxy-phenyl)-2,3-dihydro-(benzo-1,3-oxazine) were obtained. The product had the structural formula

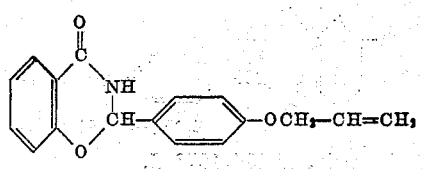

and a melting point of 196–197° C.

EXAMPLE 20

24.3 gm. p-allyloxy-benzaldehyde, 31.5 gm. 5-bromo-salicylamide and 1 gm. p-toluenesulfonic acid were admixed with 200 cc. absolute benzene, and the resulting mixture was heated and refluxed, accompanied by stirring. The water liberated by the condensation reaction was separated in a water separator. After two and one half hours the reaction had gone to completion. After cooling the reaction mass, crystals separated out which were filtered off, stirred with petroleum ether, again filtered off, dried, stirred with 2 N NaOH, filtered off on a vacuum filter, washed with water until neutral and recrystallized from glacial acetic acid. 36.8 gm. 6-bromo-4-oxo-2 - (p - allyloxy-phenyl)-2,3-dihydro-(benzo-1,3-oxazine) were obtained. The product had the structural formula

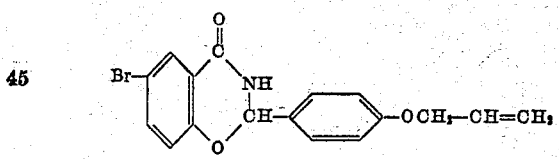

and a melting point of 214–216° C.

EXAMPLE 21

27.5 gm. salicylaldehyde-β-chloroethyl ether, 20 gm. salicylamide and 0.5 cc. concentrated sulfuric acid were admixed with 200 cc. absolute benzene and the resulting mixture was heated and refluxed, accompanied by stirring. The water liberated by the condensation reaction was separated in a water separator. The reaction had gone to completion after one and one half hours. The benzene was removed from the reaction mass by distillation, the oily residue was dissolved in chloroform. The solution was then washed, first with 2 N NaOH and then with water. After distilling off the solvent a crystalline residue remained behind, which was recrystallized from ethyl acetate. 28.7 gm. 4-oxo-2-(o-[β-chloro-ethoxy]-phenyl)-2,3 dihydro-(benzo-1,3-oxazine) were obtained. The product had the structural formula

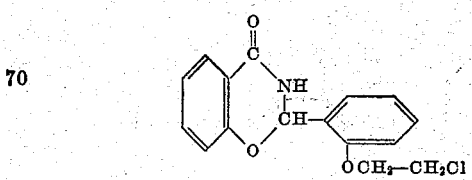

and a melting point of 139–141° C.

EXAMPLE 22

27.5 gm. salicylaldehyde-β-chloroethyl ether, 31.5 gm. 5-bromo-salicylamide and 0.5 cc. concentrated sulfuric acid were admixed with 200 cc. benzene, and the resulting mixture was heated and refluxed, accompanied by stirring. The water liberated by the condensation reaction was separated in a water separator. The reaction had gone to completion after two and one half hours. Upon cooling the reaction mass, a precipitate was formed which was filtered off on a vacuum filter, stirred with 2 N NaOH, again filtered off, washed with water until neutral, dried and recrystallized from isopropanol. 42.7 gm. 6-bromo-4-oxo-2-(o-[β-chloroethoxy]-phenyl)-2,3-dihydro-(benzo-1,3-oxazine) were obtained. The product had the structural formula

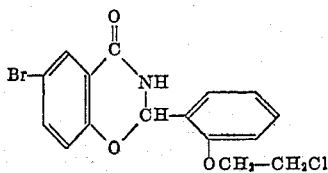

and a melting point of 186–187° C.

EXAMPLE 23

25 gm. p-(β-chloro-ethoxy)-benzaldehyde and 18 gm. salicylamide were suspended in 75 cc. absolute ethanol, and the resulting suspension was heated to 50° C. Thereafter, a strong stream of dry hydrogen chloride gas was passed through the warm suspension. After about four minutes the suspended matter had all gone into solution. The solution was then poured into 500 cc. ice cold water, whereby a crystalline precipitate formed after a short period of time. The precipitate was filtered off and washed, first with 2 N NaOH and then with water, and was recrystallized from methyl-ethyl-ketone. 24.3 gm. 4-oxo-2-(p-[β-chloroethoxy]-phenyl)-2,3-dihydro-(benzo-1,3-oxazine) were obtained. The product had the structural formula

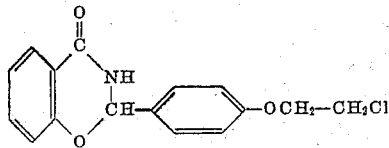

and a melting point of 191–192° C.

EXAMPLE 24

25 gm. p-(β-chloroethoxy)-benzaldehyde, 28.5 gm. 5-bromo-salicylamide and 1 gm. p-toluenesulfonic acid were admixed with 200 cc. absolute toluene, and the resulting mixture was heated and refluxed, accompanied by stirring. The water liberated by the condensation reaction was separated in a water separator. The reaction had gone to completion after three hours of refluxing. The toluene solvent was distilled off by vacuum distillation. The oil residues was caused to crystallize by adding a small amount of petroleum ether thereto; the crystals were filtered off, washed first with 2 N NaOH and then with water, and finally recrystallized from glacial acetic acid. 31.4 gm. 6-bromo-4-oxo-2-(p-[β-chloroethoxy]-phenyl)-2,3-dihydro-(benzo - 1,3 - oxazine) were obtained. The product had the structural formula

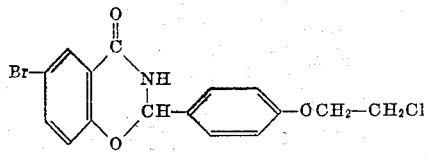

and a melting point of 234–235° C.

EXAMPLE 25

279 gm. salicylaldehyde-β-methoxyethyl ether, 22 gm. salicylamide and 0.5 gm. p-toluenesulfonic acid were admixed with 250 cc. absolute benzene. The resulting mixture was heated and refluxed, accompanied by stirring. The water liberated by the condensation reaction was separated in a water separator. The reaction had gone to completion after two hours of refluxing. The benzene was distilled off, the residue was dissolved in chloroform, the solution was washed first with 2 N NaOH and then with water, dried over calcium chloride, and the chloroform solvent was removed by vacuum distillation. The oily residue crystallized after allowing it to stand for about 24 hours at 0° C. The crystalline product was recrystallized from methanol. 28.9 gm. 4-oxo-2-(o-[β-methoxy-ethoxy]-phenyl)-2,3-dihydro-(benzo-1,3-oxazine) were obtained. The product had the structural formula

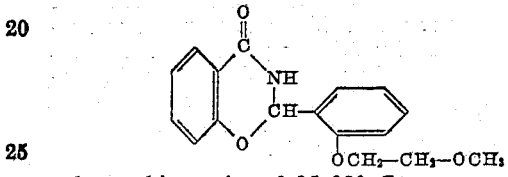

and a melting point of 95–98° C.

EXAMPLE 26

46 gm. salicylaldehyde-β-ethoxyethyl ether, 30 gm. salicylamide and 0.5 gm. p-toluenesulfonic acid were admixed with 250 cc. absolute benzene, and the resulting mixture was heated and refluxed, accompanied by stirring. The water liberated by the condensation reaction was separated in a water separator. The condensation reaction had gone to completion after two and a half hours of refluxing. The benzene solvent was distilled off by vacuum distillation. The solid residue was stirred with a small amount of 2 N NaOH, washed with water until neutral, and finally recrystallized from methanol. 51.7 gm. 4-oxo-2-(o-[β-ethoxy-ethoxy]-phenyl)-2,3-dihydro-(benzo-1,3-oxazine) were obtained. The product had the structural formula

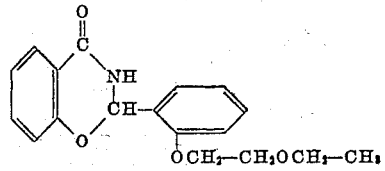

and a melting point of 96–97° C.

EXAMPLE 27

25 gm. p-β-ethoxy-ethoxy)-benzaldehyde, 37.5 gm. 5-bromo-salicylamide and 0.5 cc. concentrated sulfuric acid were admixed with 200 cc. absolute toluene, and the resulting mixture was heated and refluxed, accompanied by stirring. The water liberated by the condensation reaction was separated in a water separator. The condensation reaction had gone to completion after three hours of refluxing. The toluene solvent was removed by vacuum distillation. The residue was stirred with a small amount of 2 N NaOH, filtered off on a vacuum filter, washed with water until neutral and finally recrystallized from ethanol. 34.8 gm. 6-bromo-4-oxo-2-(p-[β-ethoxyethoxy] - phenyl) - 2,3 - dihydro - (benzo - 1,3 - oxazine) were obtained. The product had the structural formula

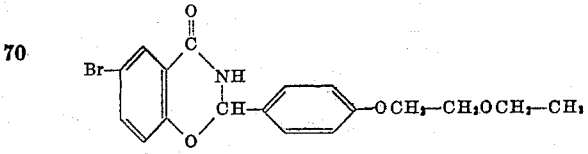

and a melting point of 188–190° C.

EXAMPLE 28

25 gm. p-(β-ethoxy-ethoxy)-benzaldehyde and 17.5 gm. salicylamide were suspended in 80 cc. absolute ethanol, and the resulting suspension was heated to 50° C. Thereafter, a vigorous stream of dry hydrogen chloride gas was passed through the suspension. After three minutes all of the suspended material had gone into solution. The solution was then poured into 400 cc. ice cold water, whereby a crystalline precipitate formed. After a short period of time the precipitate was filtered off, washed first with 2 N NaOH and then with water and finally recrystallized from a 1:1 mixture of methanol and water. 21.2 gm. 4-oxo-2(p-[β-ethoxy-ethoxy]-phenyl) - 2,3 - dihydro-(benzo-1,3-oxazine) were obtained. The product had the structural formula

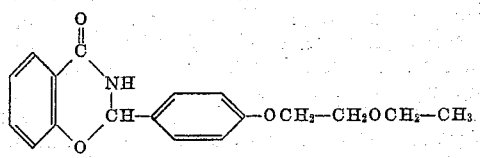

and a melting point of 134–136° C.

EXAMPLE 29

16.1 gm. salicylaldehyde-allyl ether, 17.2 gm. 5-chloro-salicylamide and 1 gm. benzenesulfonic acid were admixed with 250 cc. absolute benzene, and the resulting mixture was heated and refluxed, accompanied by stirring. After two and a half hours of refluxing, 85% of the theoretical amount of water liberated by the condensation reaction had collected in a water separator attached to the reflux apparatus. The benzene solvent was removed from the reaction mixture by vacuum distillation, and the residue was dissolved in chloroform. The solution was shaken twice with 1 N NaOH and then washed with water until free from alkali. After drying the solution over sodium sulfate, the solvent was distilled off, and the residue was caused to crystallize by scratching. The crystalline product was recrystallized from ethanol. 21 gm. 6-chloro-4-oxo-2-(o-allyloxy-phenyl)-2,3 - dihydro - (benzo - 1,3-oxazine) were obtained. The product had the structural formula

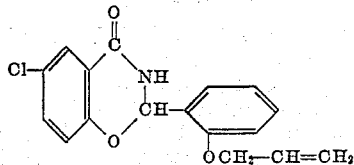

and a melting point of 126–128° C.

The same compound was obtained when, instead of benzenesulfonic acid, p-toluenesulfonic acid was used as the condensation agent.

EXAMPLE 30

21.6 gm. 5-bromo-salicylamide, 16.1 gm. salicylaldehyde-allylether and 1 gm. p-toluenesulfonic acid were admixed with 200 cc. dry chloroform, and the resulting mixture was heated under reflux in a reflux vessel provided with a water separator. After two and a half hours 1.7 cc. water, that is 95% of the theoretical amount liberated by the condensation reaction, had collected in the water separator. After cooling, the reaction solution was extracted twice with 1 N NaOH and was then washed with water until the wash water was neutral. Thereafter the solution was dried over sodium sulfate and the solvent was distilled off. The residue was recrystallized from ethanol. 23.5 gm. 6-bromo-4-oxo-2-(o-allyloxy-phenyl)-2,3 - dihydro - (benzo - 1,3-oxazine) were obtained. The product had the structural formula

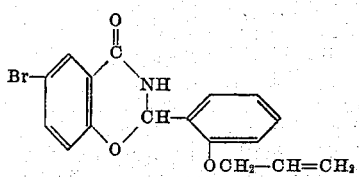

and a melting point of 129–131° C.

The same compound was obtained when, in place of benzene, chloroform was used as a solvent.

EXAMPLE 31

13.7 gm. salicylamide, 16.2 gm. m-allyloxy-benzaldehyde and 1 gm. benzenesulfonic acid were admixed with 200 cc. absolute chloroform, and the resulting mixture was heated under reflux, accompanied by stirring. The water liberated by the condensation reaction was collected in a water separator. After about two hours the condensation reaction had gone to completion. After cooling the reaction solution a precipitate formed, which was filtered off. The filtrate was evaporated to dryness. The solid residue was combined with the filter cake and stirred into a small amount of 1 N NaOH. After filtering off the solid components, the filter cake was washed with water until free from alkali and recrystallized from ethanol. 22 gm. 4 - oxo - 2 - (m-allyloxy-phenyl)-2,3-dihydro-(benzo-1,3-oxazine) were obtained. The product had the structural formula

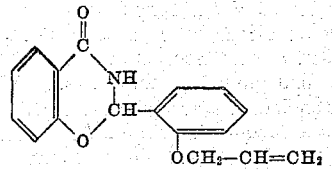

and a melting point of 131–132° C.

The same product was obtained when benzene was substituted for chloroform as the solvent, and p-toluenesulfonic acid was substituted for benzenesulfonic acid as the condensation catalyst in the above example.

EXAMPLE 32

17.2 gm. 5-chloro-salicylamide, 16.2 gm. m-allyloxy-benzaldehyde and 0.5 cc. concentrated sulfuric acid were admixed with 200 cc. absolute benzene, and the resulting mixture was heated under reflux, accompanied by stirring. The water released by the condensation reaction was collected in a water separator. After about three hours the condensation reaction had gone to completion. The reaction solution was cooled and the precipitate formed thereby was filtered off. The filter cake was stirred into a small amount of 1 N NaOH, filtered off and the filter cake was washed with water until the wash water reacted neutral. The raw product was then recrystallized from ethyl acetate. 22.3 gm. 6-chloro-4-oxo-2-(m-allyloxy-phenyl)-2,3-dihydro-(benzo-1,3-oxazine) were obtained. The product had the structural formula

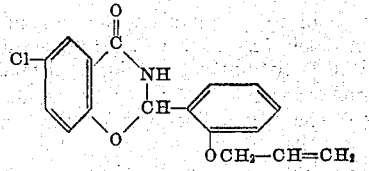

and a melting point of 185–186° C.

EXAMPLE 33

21.7 gm. 5-bromo-salicylamide, 16.2 gm. m-allyloxy-benzaldehyde and 1 cc. syrupy phosphoric acid were admixed with 200 cc. absolute benzene, and the resulting mixture was heated under reflux, accompanied by stirring. The water liberated by the condensation reaction was collected in a water separator. After about two hours the condensation had gone to completion. The reaction mixture was cooled, the precipitate formed thereby was filtered off on a vacuum filter and the filtrate was extracted twice with 1 N NaOH. The filtrate was washed with water and the benzene solvent was distilled off by vacuum distillation. The solid distillation residue was combined with the filter cake previously obtained and the combined solids were recrystallized from methyl-ethyl-ketone. 25 gm. 6-bromo-4-oxo-2-(m-allyloxy-phenyl)-2,3-dihydro-(benzo-1,3-oxazine) were obtained. The product had the structural formula

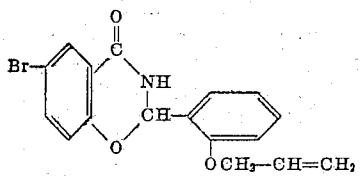

and a melting point of 192–193° C.

The same compound was obtained when p-toluene-sulfonic acid was used as the condensation catalyst in place of phosphoric acid.

EXAMPLE 34

18.4 gm. m-($\beta$-chloro-ethoxy)-benzaldehyde, 13.7 gm. salicylamide and 1 gm. benzenesulfonic acid were admixed with 200 cc. absolute toluene, and the resulting mixture was heated under reflux, accompanied by stirring. The water released by the condensation reaction was collected in a water separator. After 2.5 hours the condensation had gone to completion. The reaction solution was cooled, the precipitate formed thereby was filtered off on a vacuum filter, and the filtrate was evaporated in vacuo. The oily residue was stirred with petroleum ether and the crystalline product formed thereby was combined with the filter cake previously obtained. The combined solids were stirred with 1 N NaOH, thereafter washed with water until free from alkali and finally recrystallized from ethyl acetate. 24.8 gm. 4-oxo-2-(m-[$\beta$-chloro-ethoxy]-phenyl) - 2,3 - dihydro-(benzo-1,3-oxazine) were obtained. The product had the structural formula

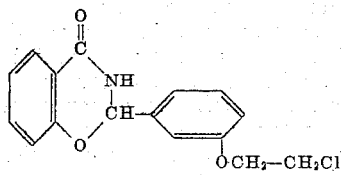

and a melting point of 149–150° C.

The same compound was obtained when the condensation reaction was carried out in benzene as the solvent and in the presence of p-toluenesulfonic acid as a condensation catalyst.

EXAMPLE 35

17.1 gm. 5-chloro-salicylamide, 18.4 gm. m-($\beta$-chloro-ethoxy)-benzaldehyde and 1 gm. p-toluenesulfonic acid were admixed with 200 cc. absolute benzene, and the resulting mixture was heated under reflux, accompanied by stirring. The water liberated by the condensation reaction was collected in a water separator. The condensation reaction had gone to completion after about three hours. The reaction solution was cooled, whereby a crystalline precipitate was formed which was filtered off on a vacuum filter and then stirred with 1 N NaOH. The alkaline mixture was washed with water until the wash water was neutral. The remaining substance was recrystallized from ethyl acetate. 26 gm. 6-chloro-4-oxo-2-(m-[$\beta$-chloro-ethoxy]-phenyl) - 2,3 - dihydro-(benzo-1,3-oxazine) were obtained. The product had the structural formula

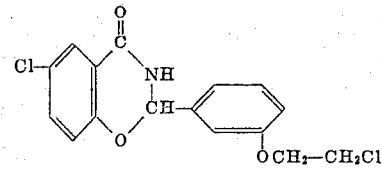

and a melting point of 184–195° C.

EXAMPLE 36

21.6 gm. 5-bromo-salicylamide, 18.4 gm. m-($\beta$-chloro-ethoxy)-benzaldehyde and 1 gm. syrupy phosphoric acid were admixed with 200 cc. absolute toluene, and the resulting mixture was heated under reflux, accompanied by stirring. The water released by the condensation reaction was collected in a water separator. After 2.5 hours the condensation reaction had gone to completion. The reaction solution was cooled, the precipitate formed thereby was filtered off on a vacuum filter, and the filtrate was evaporated under reduced pressure. The evaporation residue was stirred with petroleum ether and the solid product formed thereby was combined with the filter cake previously obtained. The combined solid product was stirred with 1 N NaOH. The alkaline mixture was washed with water until free from alkali. The raw product was then recrystallized from ethyl acetate. 24.8 gm. 6-bromo-4-oxo - 2 - (m-[$\beta$-chloro-ethoxy]-phenyl)-2,3-dihydro-(benzo-1,3-oxazine) were obtained. The product had the structural formula

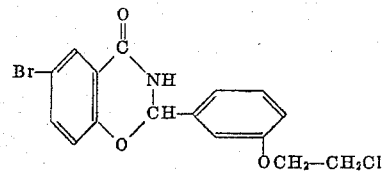

and a melting point of 186–187° C.

The same compound was obtained when the condensation reaction was carried out in benzene as a solvent and with p-toluenesulfonic acid as the condensation catalyst.

EXAMPLE 37

20 gm. salicylamide 34 gm. o-($\beta$-bromo-ethoxy)-benzaldehyde and 0.5 cc. concentrated sulfuric acid were admixed with 250 cc. dry chloroform, and the resulting mixture was heated under reflux, accompanied by stirring. The water liberated by the condensation reaction was collected in a water separator. After three hours of refluxing the condensation reaction had gone to completion. The reaction solution was extracted twice with 1 N NaOH and then washed with water until free from alkali. The solution was dried over sodium sulfate and the chloroform solvent was distilled off. The residue was recrystallized from ethyl acetate. 45.3 gm. 4-oxo-2-(o-[$\beta$-bromo-ethoxy]-phenyl) - 2,3 - dihydro-(benzo-1,3-oxazine) were obtained. The product had the structural formula

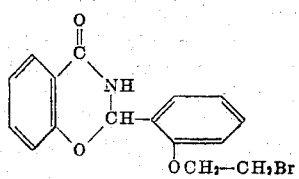

and a melting point of 145–147°C.

The same product was obtained when the condensation was carried out in the presence of benzene as the solvent in place of chloroform.

EXAMPLE 38

12 gm. 5-chloro-salicylamide, 17 gm. o-(β-bromo-ethoxy)-benzaldehyde and 1 gm. benzene sulfonic acid were admixed with 200 cc. absolute benzene, and the resulting mixture was heated under reflux, accompanied by stirring. The water released by the condensation reaction was collected in a water separator. After three hours of refluxing the condensation reaction had gone to completion. After allowing the reaction solution to cool, the precipitate formed thereby was filtered off on a vacuum filter, and the filtrate was extracted twice with 1 N NaOH and washed with water until free from alkali. Thereafter, the benzene solvent was distilled off under reduced pressure. The distillation residue was combined with the filter cake previously obtained and recrystallized from methyl-ethyl-ketone. 19.8 gm. 6-chloro-4-oxo-2-(o-[β-bromo - ethoxy] - phenyl) - 2,3 - dihydro - (benzo - 1,3-oxazine) were obtained. The product had the structural formula

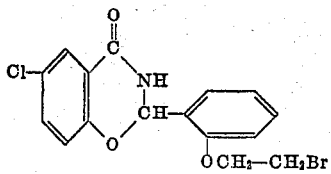

and a melting point of 202–203° C.

The same compound was obtained when, in place of benzenesulfonic acid, p-toluenesulfonic acid was used as the condensation catalyst.

EXAMPLE 39

13.7 salicylamide, 20.8 gm. p-(β-propoxy-ethoxy)-benzaldehyde and 1 cc. syrupy phosphoric acid were admixed with 200 cc. dry chloroform, and the resulting mixture was heated under reflux, accompanied by stirring. The water liberated by the condensation reaction was collected in a water separator. After about six hours the reaction had gone to completion. The reaction solution was extracted twice with 1 N NaOH and then washed with water until free from alkali. Thereafter, it was dried over sodium sulfate, the chloroform was distilled off and the distillation residue was recrystallized from ethanol. 22.2 gm. 4-oxo-2-(p-[β-propoxy-ethoxy]-phenyl)-2,3-dihydro-(benzo-1,3-oxazine) were obtained. The product had the structural formula

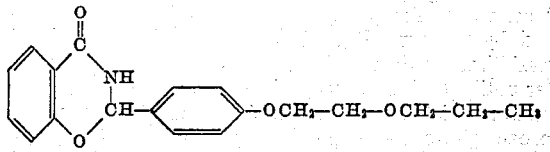

and a melting point of 111–112° C.

The same compound was obtained when the above condensation reaction was carried out in the presence of benzene as the solvent and p-toluenesulfonic acid as the condensation catalyst.

EXAMPLE 40

17.2 gm. 5-chloro-salicylamide, 20.8 gm. p-(β-propoxy-ethoxy)-benzaldehyde and 0.5 cc. concentrated sulfuric acid were admixed with 200 cc. absolute benzene, and the resulting mixture was heated under reflux, accompanied by stirring. The water released by the condensation reaction was collected in a water separator. After about five hours of refluxing the reaction had gone to completion. The reaction solution was cooled, whereby a precipitate formed which was separated by vacuum filtration. The filtrate was evaporated under reduced pressure and the oily residue obtained therefrom was stirred with a small amount of cold ether, whereby it crystallized. The crystalline product was combined with the filter cake and stirred with 1 N NaOH. The mass was again filtered and the filter cake was washed with water until the wash water reacted neutral. The filter cake was then recrystallized from ethyl-acetate. 28.6 gm. 6-chloro-4-oxo-2-(p - [β - propoxy - ethoxy] - phenyl) - 2,3 - dihydro-(benzo-1,3-oxazine) were obtained. The product had the structural formula

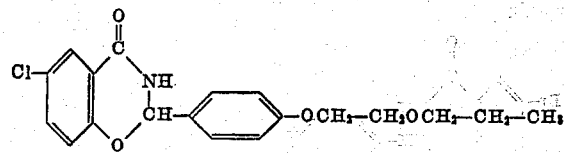

and a melting point of 171–172° C.

EXAMPLE 41

21.6 gm. 5-bromo-salicylamide, 20.8 gm. p-(β-propoxy-ethoxy)-benzaldehyde and 0.5 cc. concentrated sulfuric acid were admixed with 200 cc. dry chloroform, and the resulting mixture was heated under reflux, accompanied by stirring. The water released by the condensation reaction was collected in a water separator. After about six hours the reaction had gone to completion. The reaction solution was then extracted twice with 1 N NaOH and then washed with water until free from alkali. Thereafter, the solution was dried over sodium sulfate and the solvent was distilled off. The distillation residue was recrystallized from ethanol. 28 gm. 6-bromo-4-oxo-2-(p-[β - propoxy - ethoxy] - phenyl) - 2,3 - dihydro - (benzo-1,3-oxazine) were obtained. The product had the structural formula

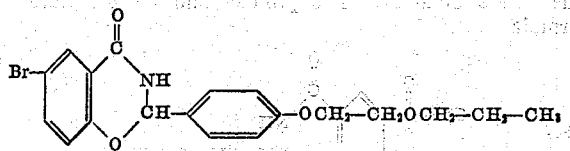

and a melting point of 163–164° C.

The same compound was obtained when the condensation was carried out in benzene as the solvent.

EXAMPLE 42

17.2 gm. 5-chloro-salicylamide, 22.2 gm. o-(β-butoxy-ethoxy)-benzaldehyde and 0.5 cc. concentrated sulfuric acid were admixed with 200 cc. absolute toluene, and the resulting mixture was heated under reflux, accompanied by stirring. The water released by the condensation reaction was collected in a water sepaartor. After three hours of refluxing the reaction had gone to completion. The reaction solution was extracted twice with 1 N NaOH and then washed with water until free from alkali. The solution was dried over sodium sulfate and the toluene solvent was distilled off under reduced pressure. The oily residue was scratched, whereby it crystallized, and the crystals were recrystallized from ethanol. 30.4 gm. 6-chloro-4-oxo-2-(o-[β-butoxy-ethoxy]-phenyl)-2,3-dihydro-(benzo-1,3-oxazine) were obtained. The product had the structural formula

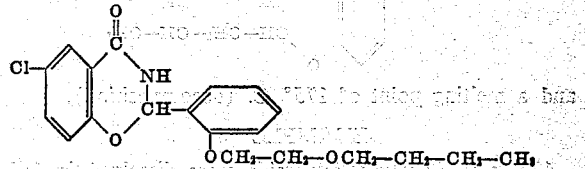

and a melting point of 90–91° C.

EXAMPLE 43

21.6 gm. 5-bromo-salicylamide and 22.2 gm. o-(β-butoxy-ethoxy)-benzaldehyde were suspended in 50 cc. absolute ethanol, and the suspension was heated to 50° C. Thereafter, a vigorous stream of dry hydrogen chloride gas was passed through the suspension. After 5 minutes the entire suspended material had gone into solution.

The solution was then poured into 500 cc. ice cold water. A crystalline precipitate formed after a short period of time, which was filtered off, washed with 1 N NaOH and then with water. The crystalline raw product was then recrystallized from ethanol. 26 gm. 6-bromo-4-oxo-2-(o-[β-butoxy-ethoxy]-phenyl)-2,3-dihydro - (benzo - 1,3-oxazine) were obtained. The product had the structural formula

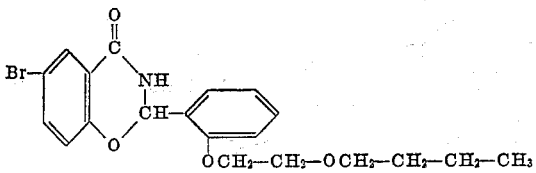

and a melting point of 115–117° C.

The same compound was obtained when absolute benzene was used as the solvent and p-toluenesulfonic acid was used as the condensation catalyst.

EXAMPLE 44

15 gm. 5-acetyl-salicyclamide were dissolved in 150 cc. glacial acetic acid, and the solution was saturated with dry hydrogen chloride gas. 4.6 gm. acrolein were added to the solution and the mixture was heated to 40° C. for one hour. The reaction solution was poured into 500 cc. water, whereby a precipitate formed, which was stirred into 1 N NaOH. The alkaline mixture was washed with water until the wash water reacted neutral, and the residue was recrystallized from ethanol. 9.5 gm. 6-acetyl-4-oxo-2-(β-chloro-ethyl)-2,3-dihydro - (benzo - 1,3 - oxazine) were obtained. The product had the structural formula

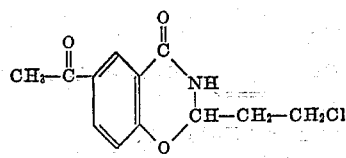

and a melting point of 167–168° C. (decomposition).

EXAMPLE 45

20 gm. 5-acetyl-salicylamide were dissolved in 200 cc. glacial acetic acid, and the solution was saturated with hydrogen chloride gas. 7.8 gm. crotonaldehyde were added to the solution, and the mixture was heated to 40° C. for 1 hour while continuing to pass hydrogen chloride therethrough. The reaction solution was poured into 500 cc. water, the precipitate formed thereby was separated from the liquid phase, stirred with 1 N NaOH and washed with water until free from alkali. Thereafter, it was recrystallized from ethanol. 17.8 gm. 6-acetyl-4-oxo-2-(β-chloro-propyl) - 2,3 - dihydro - (benzo-1,3-oxazine) were obtained. The product had the structural formula

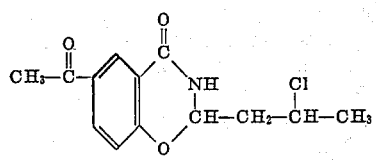

and a melting point of 175° C. (decomposition).

EXAMPLE 46

17.9 gm. 5-acetyl-salicylamide were dissolved in 150 cc. glacial acetic acid, and the solution was saturated with hydrogen chloride gas. 7.7 gm. α-methacrolein were added thereto. The mixture was heated to 60° C. for 1 hour while continuing to pass hydrogen chloride gas therethrough, and it was then poured into 600 cc. water. The precipitate formed thereby was dissolved in chloroform, the solution was shaken twice with 100 cc. portions of 1 N NaOH and thereafter washed with water until free from alkali. Subsequently it was dried over calcium chloride and the chloroform solvent was distilled off. The distillation residue was stirred with a small amount of ethyl acetate to cause it to crystallize. The crystalline product was filtered off by vacuum filtration and then recrystallized from ethyl acetate. 12.5 gm. 6-acetyl-4-oxo-2-(α-methyl-β-chloro-ethyl) - 2,3 - dihydro-(benzo-1,3-oxazine) were obtained. The product had the structural formula

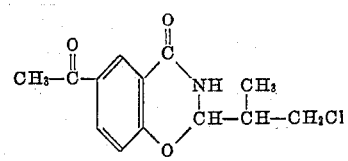

and a melting point of 158–159° C.

EXAMPLE 47

17 gm. 5-chloroacetyl-salicylamide were suspended in 200 cc. glacial acetic acid and the suspension was saturated with dry hydrogen chloride gas. 4.5 gm. acrolein were added thereto, and the resulting mixture was heated to 40° C. for 1 hour while passing additional hydrogen chloride gas therethrough. The reaction mass was poured into 600 cc. water and the precipitate formed thereby was separated by vacuum filtration. The filter cake was stirred twice with 100 cc. portions of 1 N NaOH and thereafter washed with water until free from alkali. After recrystallization from a mixture of ethyl acetate and acetone, 13.2 gm. 6-chloroacetyl-4-oxo-2-(β-chloro-ethyl)-2,3-dihydro-(benzo-1,3-oxazine) were obtained. The product had the structural formula

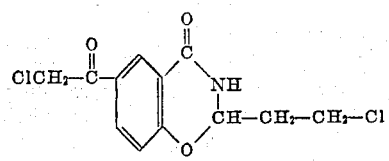

and a melting point of 187–188° C. (decomposition).

EXAMPLE 48

17 gm. 5-chloroacetyl-salicylamide were suspended in 150 cc. glacial acetic acid, and the suspension was saturated with dry hydrogen chloride gas. 5.6 gm. crotonaldehyde were added and the mixture was heated to 40° C. for 1 hour while passing additional hydrogen chloride gas therethrough. The reaction solution was poured into 600 cc. water, the precipitate formed thereby was separated by vacuum filtration, the filter cake was stirred several times with 1 N NaOH and finally washed with water until free from alkali. After recrystallization from a mixture of ethyl acetate and acetone, 13.3 gm. 6-chloroacetyl-4-oxo - 2 - (β - chloropropyl) - 2,3 - dihydro-(benzo-1,3-oxazine) were obtained. The product had the structural formula

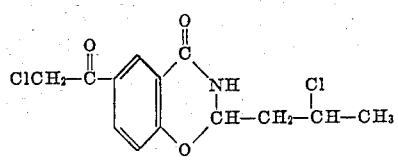

and a melting point of 180–181° C. (decomposition).

EXAMPLE 49

15.5 gm. 5-propionyl-salicylamide were suspended in 150 cc. glacial acetic acid and the suspension was saturated with dry hydrogen chloride. 5.6 gm. acrolein were added thereto, and the resulting mixture was heated to 60° C. for 40 minutes. The reaction mixture was then poured into 600 cc. water, the precipitate formed thereby was separated by vacuum filtration, stirred with 100 cc. 1 N NaOH and washed with water until free from alkali. After recrystallization from ethanol, 13.2 gm. 6- propionyl - 4 - oxo - 2 - (β - chloroethyl) - 2,3 - dihydro-(benzo-1,3-oxazine) were obtained. The product had the structural formula

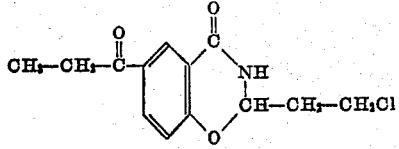

and a melting point of 180–181° C. (decomposition).

EXAMPLE 50

15.5 gm. 5-propionyl-salicylamide were suspended in 150 cc. glacial acetic acid, and the suspension was saturated with dry hydrogen chloride. 7 gm. crotonaldehyde were added thereto and the mixture was heated to 60° C. for 30 minutes while passing additional hydrogen chloride gas therethrough. The reaction solution was then poured into 500 cc. water, the precipitate formed thereby was separated by vacuum filtration, and the filter cake was stirred with 1 N NaOH and washed with water until free from alkali. The raw product was recrystallized from ethanol. 15.2 gm. 6-propionyl-4-oxo-2-(β-chloropropyl)-2,3-dihydro-(benzo-1,3-oxazine) were obtained. The product had the structural formula

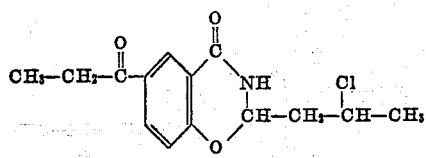

and a melting point of 178° C.

EXAMPLE 51

15.5 gm. 5-propionyl-salicylamide were suspended in 150 cc. glacial acetic acid and dry hydrogen chloride gas was introduced into this suspension until it was saturated. 7 gm. α-methacrolein were added to this suspension, and it was then heated for 30 minutes at 60° C. while passing additional hydrogen chloride gas therethrough. The reaction solution was then poured into 500 cc. water and the precipitate formed thereby was separated and dissolved in chloroform. The resulting solution was shaken twice with 100 cc. portions of 1 N NaOH and finally washed with water until free from alkali. Subsequently, the solution was dried over calcium chloride and the solvent was distilled off at reduced pressure. The distillation residue was recrystallized from ethanol. 13 gm. 6 - propionyl - 4 - oxo - 2 - (α - methyl - β - chloroethyl)-2,3-dihydro-(benzo-1,3-oxazine) were obtained. The product had the structural formula

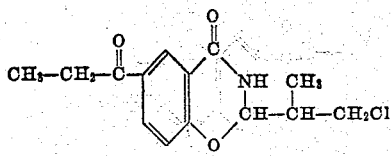

and a melting point of 167–169° C. (decomposition).

EXAMPLE 52

29 gm. 5-butyryl-salicylamide were suspended in 150 cc. glacial acetic acid, the resulting suspension was saturated with dry hydrogen chloride gas and 10 gm. acrolein were added to the resulting mixture. The reaction solution was then heated for 45 minutes at 60° C. while passing additional hydrogen chloride therethrough, and was thereafter poured into 500 cc. water. The precipitate formed thereby was separated and stirred with 200 cc. 1 N NaOH, washed with water until free from alkali and finally recrystallized from ethanol. 24.8 gm. 6-butyryl - 4 - oxo - 2 - (β - chloroethyl) - 2,3 - dihydro - (benzo-1,3-oxazine) were obtained. The product had the structural formula

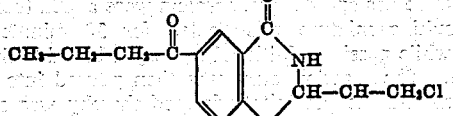

and a melting point of 173° C. (decomposition).

EXAMPLE 53

14.5 gm. 5-butyryl-salicylamide were suspended in 150 cc. glacial acetic acid and the resulting suspension was saturated with dry hydrogen chloride gas. 6.3 gm. crotonaldehyde were added to this suspension and the resulting mixture was heated for 30 minutes at 60° C. and was thereafter poured into 600 cc. water. The product precipitated thereby was separated by vacuum filtration, stirred with 100 cc. 1 N NaOH and washed until free from alkali. Upon recrystallization from ethanol, 8.8 gm. 6-butyryl-4-oxo-2-(β-chloropropyl)-2,3-dihydro-(benzo-1,3-oxazine) were obtained. The product had the structural formula

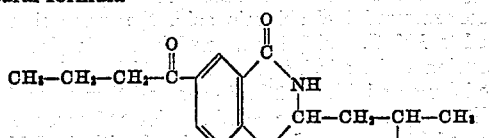

and a melting point of 164° C. (decomposition).

EXAMPLE 54

14.5 gm. 5-butyryl-salicylamide were suspended in 150 cc. glacial acetic acid and the suspension was saturated with dry hydrogen chloride gas. 6.3 gm. α-methacrolein were added to the suspension and the resulting mixture was heated for 20 minutes at 60° C. The reaction solution was then poured into 600 cc. water, whereby an oily substance precipitated out. The precipitate was separated and allowed to stand for several hours, whereupon it crystallized. It was filtered on a vacuum filter, the filter cake was stirred with 100 cc. 1 N NaOH and then washed with water until free from alkali. Upon recrystallization from ethanol, 10.4 gm. 6-butyryl-4-oxo-2-(α-methyl - β - chloroethyl) - 2,3 - dihydro - (benzo - 1,3 - oxazine) were obtained. The product had the structural formula

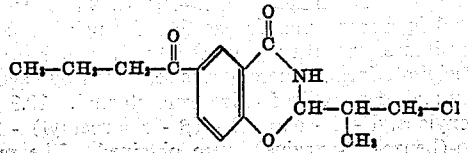

and a melting point of 142–143° C.

EXAMPLE 55

14.5 gm. 5-butyryl-salicylamide were dissolved in 150 cc. of a 48% hydrogen bromide solution, and the resulting solution was admixed with 5 gm. acrolein. The mixture was stirred for 10 minutes at 30° C. and was thereafter poured into 1 liter water. The precipitate formed thereby was separated by vacuum filtration, stirred with 1 N NaOH and washed with water until free from alkali. Upon recrystallization from ethyl acetate, 10.5 gm. 6-butyryl - 4 - oxo - 2 - (β - bromoethyl) - 2,3 - dihydro - (benzo-1,3-oxazine) were obtained. The product had the structural formula

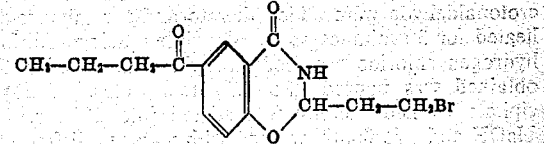

and a melting point of 148–150° C.

EXAMPLE 56

A suspension of 14 gm. 5-chloroacetyl-salicylamide in 150 cc. glacial acetic acid were saturated with dry hydrogen bromide gas and 4.5 gm. acrolein were added thereto. The resulting mixture was heated for 30 minutes at 60° C. while passing additional hydrogen bromide therethrough. The reaction mass was then poured into 600 cc. water and the precipitate formed thereby was separated by vacuum filtration, stirred with 1 N NaOH and washed with water until free from alkali. Upon recrystallization from ethyl acetate 11.8 gm. 6-chloroacetyl-4-oxo-2-(β-bromoethyl)-2,3-dihydro-(benzo-1,3-oxazine) were obtained. The product had the structural formula

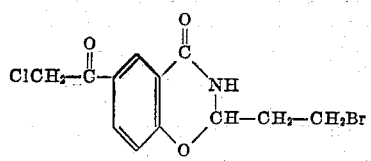

and a melting point of 160–162° C. (decomposition).

EXAMPLE 57

12 gm. 5-benzoyl-salicylamide were suspended in 250 cc. concentrated hydrochloric acid, the suspension was heated to 30° C. and 3.4 gm. acrolein were added to the suspension while stirring it. The resulting mixture was stirred for an additional 30 minutes and then poured into 1.5 liters waters. The precipitate formed thereby was separated by vacuum filtration, stirred with 1 N NaOH and washed with water until free from alkali. Upon recrystalllization from ethanol, 8.1 gm. 6-benzoyl-4-oxo-2-(β-chloroethyl)-2,3-dihydro-(benzo-1,3-oxazine) were obtained. The product had the structural formula

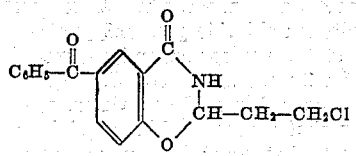

and a melting point of 195–196° C. (decomposition).

EXAMPLE 58

17.6 gm. 5-phenylacetyl-salicylamide were suspended in 150 cc. glacial acetic acid and the suspension was saturated with dry hydrogen chloride gas. 4.5 gm. acrolein were added thereto dropwise and the resulting mixture was heated for 30 minutes to 60–70° C. while passing additional hydrogen chloride gas therethrough. The reaction mixture was then poured into 1.5 liters water. The precipitate formed thereby was separated by vacuum filtration and recrystallized twice from ethanol. 10.3 gm. 6 - phenylacetyl - 4 - oxo - 2 - (β - chloroethyl) - 2,3-dihydro-(benzo-1,3-oxazine) were obtained. The product had the structural formula

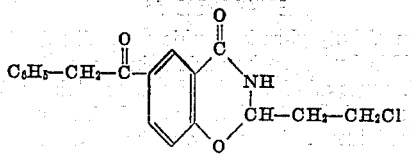

and a melting point of 161° C. (decomposition).

EXAMPLE 59

12 gm. 5-benzoyl-salicylamide were suspended in 150 cc. glacial acetic acid and the suspension was saturated with dry hydrogen chloride gas. Thereafter 4.2 gm. crotonaldehyde were added thereto and the mixture was heated for 30 minutes at 70° C. while passing additional hydrogen chloride gas therethrough. The solution thus obtained was poured into 1.5 liters water. The precipitate formed thereby was stirred into 100 cc. 1 N NaOH and was finally washed with water until free from alkali. Upon recrystallization from ethanol, 8.2 gm. 6-benzoyl - 4 - oxo - 2 - (β - chloropropyl) - 2,3 - dihydro-(benzo-1,3-oxazine) were obtained. The product had the structural formula

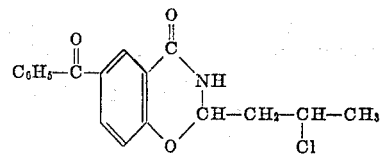

and a melting point of 192° C. (decomposition).

EXAMPLE 60

17.8 gm. 5-phenylacetyl-salicylamide were admixed with 1% by weight sodium lauryl sulfate and the mixture was suspended in 200 cc. concentrated hydrochloric acid. The resulting suspension was heated to 45° C. and 5.6 gm. crotonaldehyde were added thereto. The temperature was maintained between 45 and 50° C. for 30 minutes, whereupon the reaction mixture was poured into 1.5 liters water. The precipitate formed thereby was separated by vacuum filtration and recrystallized twice from ethanol. 6.1 gm. 6-phenylacetyl-4-oxo-2-(β-chloropropyl)-2,3-dihydro-(benzo-1,3-oxazine) were obtained. The product had the structural formula

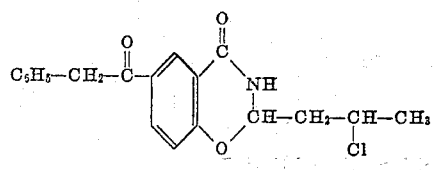

and a melting point of 182° C. (decomposition).

EXAMPLE 61

17.9 gm. 5-acetyl-salicylamide and 16.8 gm. chloroacetal were suspended in 150 cc. glacial acetic acid and the resulting suspension was heated for 3 hours at 70–80° C. while passing dry hydrogen chloride gas therethrough. The reaction solution thus obtained was poured into 1 liter of water and the precipitate formed thereby was separated and dissolved in chloroform. The solution was shaken with 150 cc. 1 N NaOH and thereafter washed with water until free from alkali. Subsequently, the solution was dried over calcium chloride and the chloroform solvent was distilled off under diminished pressure. The distillation residue was recrystallized from ethanol. 14.5 gm. 6-acetyl-4-oxo-2-chloromethyl-2,3-dihydro-(benzo-1,3-oxazine) were obtained. The product had the structural formula

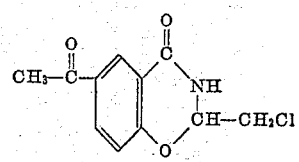

and a melting point of 156–158° C.

EXAMPLE 62

19.3 gm. 5-propionyl-salicylamide and 16.8 gm. chloroacetal were suspended in 150 cc. glacial acetic acid and the resulting suspension was heated for 3 hours at 70–80° C. while passing hydrogen chloride gas therethrough. The reaction mixture was allowed to cool and was poured into 1 liter water, whereby a precipitate formed which was separated by vacuum filtration. The filter cake was stirred with 100 cc. 1 N NaOH and was then washed with water until the wash water reacted neutral. Upon recrystallization from ethanol, 16.1 gm. 6-propionyl-4-oxo- 2-chloromethyl-2,3-dihydro-(benzo-1,3-oxazine) were obtained. The product had the structural formula

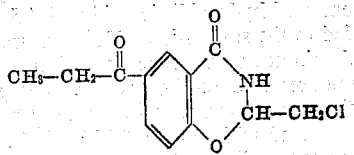

and a melting point of 176–177° C.

EXAMPLE 63

17.9 gm. 5-acetyl-salicylamide were suspended in 150 cc. glacial acetic acid and the resulting suspension was saturated with dry hydrogen chloride gas. 8.4 gm. α-ethyl-acrolein were added to the suspension, which was then heated for 45 minutes at 60° C. while continuing to pass hydrogen chloride gas therethrough. The reaction mixture was poured into 600 cc. water, whereby a precipitate formed which was dissolved in chloroform. The solution was shaken with 100 cc. 1 N NaOH and washed with water until free from alkali. After drying the solution over calcium chloride, the solvent was distilled off under reduced pressure and the distillation residue was recrystallized from ethanol. 14.9 gm. 6-acetyl-4-oxo-2-(α-ethyl-β-chloroethyl)-2,3-dihydro-(benzo-1,3-oxazine) were obtained. The product had the structural formula

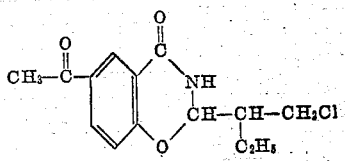

and a melting point of 153° C. (decomposition).

EXAMPLE 64

21.3 gm. 5-chloroacetyl-salicylamide, 9.5 gm. β-chloropropionaldehyde and 1 cc. concentrated sulfuric acid were admixed with 200 cc. absolute benzene, and the resulting mixture was heated for 4 hours under reflux accompanied by stirring. The water liberated by the condensation reaction was collected in a water separator. The solvent was distilled off under diminished pressure and the distillation residue was stirred with 100 cc. 1 N NaOH. The alkaline mixture was filtered on a vacuum filter and the filter cake was washed with water until the wash water reacted neutral. Upon recrystallization of the filter cake from a mixture of ethyl acetate and acetone, 17.2 gm. 6-chloroacetyl-4-oxo-2-(β-chloroethyl)-2,3-dihydro-(benzo-1,3-oxazine) were obtained. The product had the structural formula

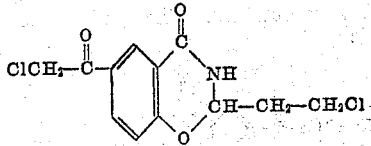

and a melting point of 187–188° C. (decomposition).

EXAMPLE 65

10.2 gm. β-ethoxy-propionaldehyde were suspended in 100 cc. chloroform and hydrogen chloride gas was passed through the suspension for about 5 minutes. 20.7 gm. 5-butyryl-salicylamide and 6 cc. glacial acetic acid were added to the suspension, and the resulting mixture was refluxed for 1 hour while passing hydrogen chloride gas therethrough. The solution was cooled and shaken twice with 75 cc. portions of 5% NaOH. The alkaline mixture was washed with water until neutral and thereafter dried over calcium chloride. After evaporating the solvent, the solid residue was recrystallized from ethanol. 15.4 gm. 6-butyryl-4-oxo-2-(β-chloroethyl)-2,3-dihydro-(benzo-1,3-oxazine) were obtained. The product had the structural formula

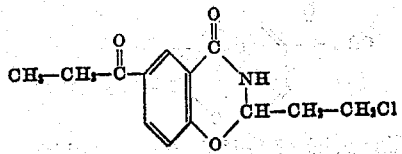

and a melting point of 173° C. (decomposition).

EXAMPLE 66

A mixture of 200 cc. chloroform and 50 cc. absolute ethanol was saturated in the cold with dry hydrogen chloride gas. Thereafter the mixture was cooled to 0° C. and 23 gm. acrolein were added dropwise thereto accompanied by stirring. 72 gm. 5-acetyl-salicylamide and 55 cc. glacial acetic acid were added to this solution, and the resulting mixture was heated for 1 hour at 60° C. The reaction mixture was allowed to cool and was then evaporated under reduced pressure. The residue was stirred with 1 N NaOH and washed with water until free from alkali. Upon recrystallization from ethanol, 56 gm. 6-acetyl-4-oxo-2-(β-chloroethyl)-2,3-dihydro-(benzo-1,3-oxazine) were obtained. The product had the structural formula

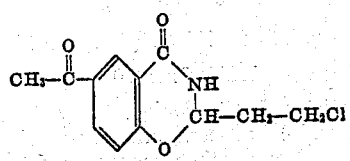

and a melting point of 167–168° C. (decomposition).

EXAMPLE 67

5.6 gm. 4-oxo-6-acetyl-2-(β-chloroethyl)-2,3-dihydro-(benzo-1,3-oxazine) and 5 gm. sodium iodide were suspended in 250 cc. acetone, and the suspension was heated for 8 hours at the boiling point. The precipitated sodium chloride was separated by vacuum filtration while the solution was still hot, and the filtrate was evaporated to dryness in vacuo. After washing the evaporation residue with water, it was recrystallized from ethanol. 6.6 gm. 4-oxo-6-acetyl-2-(β-iodoethyl)-2,3-dihydro-(benzo-1,3-oxazine) were obtained. The product had the structural formula

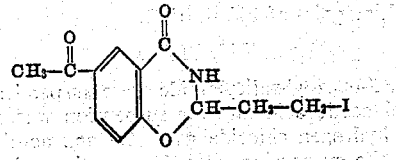

and a melting point of 159–162° C.

EXAMPLE 68

12 gm. 5-benzoyl-salicylamide, 4.8 gm. β-chloropropionaldehyde and 0.5 cc. concentrated sulfuric acid were admixed with 150 cc. absolute benzene, and the resulting mixture was heated for 4 hours under reflux accompanied by stirring. The water liberated by the condensation reaction was collected in a water separator. The reaction solution was evaporated to dryness under reduced pressure, and the residue was stirred with a small amount of petroleum ether and thereafter filtered on a vacuum filter. The filter cake was first washed with 5% NaOH and then with water until the wash water reacted neutral. The filter cake was then recrystallized from ethanol. 6.3 gm. 6-benzoyl-4-oxo-2-(β-chloroethyl)-2,3-dihydro-(benzo-1,3-oxazine) were obtained. The product had the structural formula

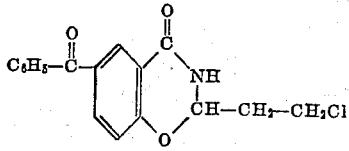

and a melting point of 196° C. (decomposition).

EXAMPLE 69

17.8 gm. 5-phenylacetyl-salicylamide, 4.8 gm. β-chloropropionaldehyde and 0.5 cc. concentrated sulfuric acid were admixed with 200 cc. chloroform, and the resulting mixture was heated for 8 hours under reflux accompanied by stirring over an extractor filled with calcium chloride. The solvent was then distilled off under reduced pressure and the solid distillation residue was washed with water and recrystallized twice from ethanol. 12 gm. 6-phenylacetyl-4-oxo-2-(β-chloroethyl)-2,3-dihydro - (benzo - 1,3-oxazine) were obtained. The product had the structural formula

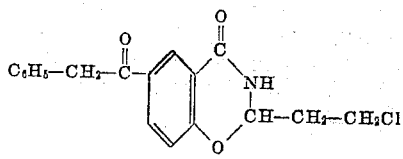

and a melting point of 161° C. (decomposition).

EXAMPLE 70

14.5 gm. 5-butyryl-salicylamide, 10 gm. β-bromopropionaldehyde and 0.5 cc. concentrated sulfuric acid were admixed with 200 cc. absolute benzene, and the resulting mixture was heated under reflux for 4 hours accompanied by stirring. The water liberated by the condensation reaction was collected in a water separator. The solvent was distilled off under reduced pressure and the distillation residue was stirred with 1 N NaOH and washed with water until free from alkali. Upon recrystallization from ethyl acetate, 11 gm. 6-butyryl-4-oxo-2-(β-bromoethyl)-2,3-dihydro-(benzo-1,3-oxazine) were obtained. The product had the structural formula

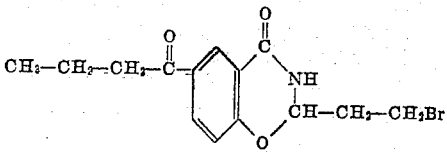

and a melting point of 148–150° C.

EXAMPLE 71

24 gm. 5-benzoyl-salicylamide were suspended in 250 cc. glacial acetic acid and the suspension was saturated with dry hydrogen chloride gas. 6.8 gm. acrolein were added to the suspension, and the resulting mixture was heated for 30 minutes at 70° C. while passing additional hydrogen chloride gas therethrough. Thereafter the reaction mixture was poured into 1.5 liters water, whereby a precipitate formed which was separated by vacuum filtration. The filter cake was stirred with 1 N NaOH, washed with water until free from alkali and finally recrystallized from ethanol. 17 gm. 6-benzoyl-4-oxo-2-(β-chloroethyl)-2,3-dihydro-(benzo-1,3-oxazine) were obtained. The product had the structural formula

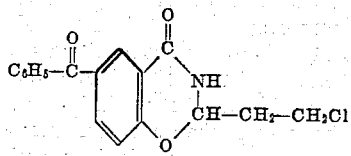

and a melting point of 195–196° C. (decomposition).

EXAMPLE 72

17 gm. 5-chloroacetyl-salicylamide were suspended in 250 cc. concentrated hydrochloric acid and 4.5 gm. acrolein were added to the suspension. The mixture was then stirred for 45 minutes at a temperature from 35–40° C. and was then poured into 1.5 liters water. The precipitate formed thereby was separated on a vacuum filter. The filter cake was stirred with 100 cc. 1 N NaOH and finally washed with water until free from alkali. Upon recrystallization from a mixture of ethyl acetate and acetone, 14.6 gm. 6-chloroacetyl-4-oxo-2-(β-chloroethyl)-2,3-dihydro-(benzo-1,3-oxazine) were obtained. The product had the structural formula

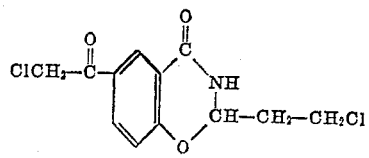

and a melting point of 188° C. (decomposition).

EXAMPLE 73

17.9 gm. 5-acetyl-salicylamide were admixed with 250 cc. concentrated hydrochloric acid and 6.2 gm. acrolein were stirred into this mixture. Stirring was continued for 45 minutes at 35° C. Thereafter the reaction solution was poured into 1.5 liters of water, whereby a precipitate formed which was separated by vacuum filtration, stirred with 100 cc. 1 N NaOH and washed with water until free from alkali. Upon recrystallization from ethanol, 14.2 gm. 6-acetyl-4-oxo-2-(β-chloroethyl)-2,3-dihydro-(benzo-1,3-oxazine) were obtained. The product had the structural formula

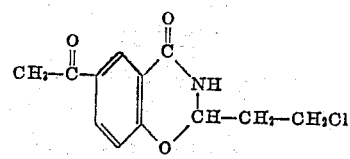

and a melting point of 168° C. (decomposition).

EXAMPLE 74

17.6 gm. 5-phenylacetyl-salicylamide were admixed with 200 cc. concentrated hydrochloric acid and 100 cc. 90% formic acid, and 4.5 gm. acrolein were added to the resulting mixture. The mixture was stirred for 30 minutes at 35–40° C. whereupon it was poured into 1.5 liters of water. The precipitate formed thereby was separated and recrystallized twice from ethanol. 12.1 gm. 6-phenylacetyl-4-oxo - 2 - (β - chloroethyl - 2,3 - dihydro - (benzo-1,3-oxazine) were obtained. The product had the structural formula

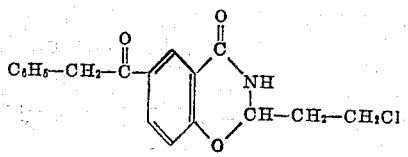

and a melting point of 160–161° C. (decomposition).

EXAMPLE 75

50 gm. salicylamide were dissolved in 250 cc. concentrated hydrochloric acid while heating the solution. After cooling the solution to about 30° C., 22.4 gm. acrolein were added to the solution within a period of about 5 minutes. Thereafter the reaction mixture was diluted with 500 cc. water accompanied by vigorous stirring. The crystalline precipitate formed thereby was separated by vacuum filtration, washed with water and recrystallized from ethanol. 42 gm. 4-oxo-2-(β-chloroethyl)-2,3-dihydro-(benzo-1,3-oxazine) were obtained. The product had the structural formula

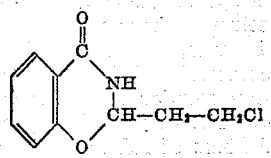

and a melting point of 146–147° C. (decomposition).

EXAMPLE 76

27.4 gm. salicylamide were dissolved in 250 cc. of 48% hydrobromic acid while heating the solution. After cooling the solution to about 30–40° C., 11.8 gm. acrolein were added thereto accompanied by vigorous stirring. Agitation was continued about 15 minutes, whereupon the reaction mixture was poured into 1.5 liters of water. The crystals precipitated thereby were separated by vacuum filtration and were washed with water and recrystallized from ethanol. 16 gm. 4-oxo-2-($\beta$-bromoethyl)-2,3-dihydro-(benzo-1,3-oxazine) were obtained. The product had the structural formula

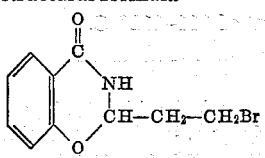

and a melting point of 129° C. (decomposition).

EXAMPLE 77

21.7 gm. 5-bromosalicylamide were dissolved in 300 cc. concentrated hydrochloric acid, the temperature of the solution was adjusted to 30° C. and 6.2 gm. acrolein were added thereto accompanied by vigorous stirring. The stirring was continued for about 1 hour at room temperature. Thereafter the reaction mixture was admixed with 1 liter of water, the crystalline precipitate was separated by vacuum filtration, washed with water and recrystallized from ethyl acetate. 6.6 gm. 6-bromo-4-oxo-2-($\beta$-chloroethyl)-2,3-dihydro-(benzo-1,3-oxazine) were obtained. The product had the structural formula

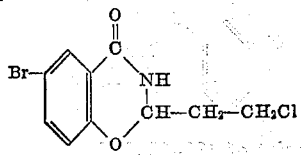

and a melting point of 158–160° C. (decomposition).

When the above procedure was repeated but 1% by volume of "Texapon Z" (highly concentrated sodium lauryl sulfate) was added, 14.3 gm. of the same product were obtained

EXAMPLE 78

200 cc. propionic acid were saturated with dry hydrogen chloride at a temperature of 5–10° C. 27.4 gm. salicylamide were then added to this mixture. Thereafter 11.2 gm. acrolein were added within a period of 15 minutes while continuing to pass hydrogen chloride gas therethrough. The reaction mixture was then heated for 1½ hours at 40–50° C. accompanied by stirring, allowed to cool and then admixed with 1 liter of water. The crystals precipitated thereby were separated by vacuum filtration, washed with water and recrystallized from ethanol. 31.2 gm. 4-oxo-2-($\beta$-chloroethyl)-2,3-dihydro-(benzo-1,3-oxazine) were obtained. The product had the structural formula

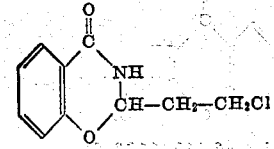

and a melting point of 146–147° C. (decomposition).

EXAMPLE 79

68.5 gm. salicylamide were added to a mixture of 250 cc. concentrated hydrochloric acid and 125 cc. 90% formic acid at 35° C. accompanied by vigorous stirring. The resulting mixture formed a clear solution after 10 minutes. Thereafter 30.8 gm. acrolein were added to the solution within a period of 10 minutes while maintaining the temperature between 35 and 40° C. After approximately 15 minutes, the reaction solution was poured into 2 liters of water. The crystalline precipitate formed thereby was separated by vacuum filtration, dried and recrystallized from ethanol. 68 gm. 4-oxo-2-($\beta$-chloroethyl)-2,3-dihydro-(benzo-1,3-oxazine) were obtained. The product had the structural formula

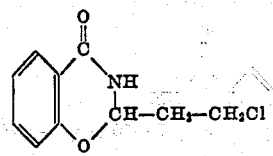

and a melting point of 146–147° C. (decomposition).

EXAMPLE 80

150 cc. glacial acetic acid were saturated with dry hydrogen chloride gas at a temperature of 5–10 C. 13.7 gm. salicylamide were added to this mixture. Subsequently, 7 gm. crotonaldehyde were added dropwise within a period of 10 minutes while continuing to introduce hydrogen chloride gas. The resulting reaction mixture was maintained at a temperature of 50° C. for 1 hour and was then allowed to cool. The reaction mixture was poured into 500 cc. water and the oil precipitated thereby was separated and caused to crystallize by scratching. The crystalline product was subjected to vacuum filtration, was stirred twice with 1 N NaOH and finally washed with water until free from alkali. Upon recrystallization from 50% ethanol, 17 gm. 4-oxo-2-($\beta$-chloropropyl)-2,3-dihydro-(benzo-1,3-oxazine) were obtained. The product had the structural formula

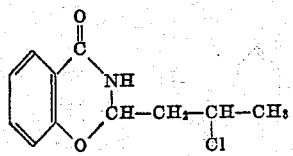

and a melting point of 124–125° C. (decomposition).

EXAMPLE 81

200 cc. glacial acetic acid were saturated with dry hydrogen chloride gas at a temperature of 5–10° C. 21.6 gm. 5-bromosalicylamide were added thereto. Subsequently, 7 gm. crotonaldehyde were added dropwise to the resulting mixture while continuing to pass hydrogen chloride gas therethrough. The reaction mixture was then maintained for 1 hour at 50° C. and allowed to cool to room temperature. The reaction mixture was then poured into 500 cc. water and the precipitate formed thereby was separated by vacuum filtration. The precipitate was stirred twice with 1 N NaOH and washed with water until free from alkali. Upon recrystallization from ethanol, 18 gm. 6-bromo-4-oxo-2-($\beta$-chloropropyl)-2,3-dihydro-(benzo-1,3-oxazine) were obtained. The product had the structural formula

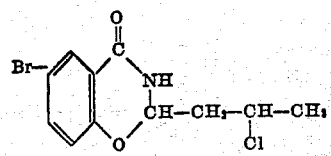

and a melting point of 142° C. (decomposition).

EXAMPLE 82

100 cc. glacial acetic acid were saturated with dry hydrogen chloride gas at a temperature of 5–10° C. 9 gm. 5-chlorosalicylamide were added thereto and subsequently 3.7 gm. crotonaldehyde were added dropwise while continuing to introduce hydrogen chloride gas. The reaction mixture was maintained at 50° C. for about 1 hour and was then allowed to cool. The reaction mixture was poured into 300 cc. water. The precipitate formed thereby was separated by vacuum filtration and washed twice with 1 N NaOH. Thereafter it was washed with water until free from alkali and recrystallized from 50% ethanol. 9.8 gm. 6-chloro-4-oxo-2-(β-chloropropyl)-2,3-dihydro-(benzo-1,3-oxazine) were obtained. The product had the structural formula

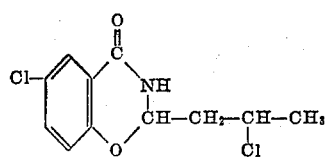

and a melting point of 144° C. (decomposition).

EXAMPLE 83

13.7 gm. salicylamide, 16.5 gm. α-bromo-isovaleroaldehyde and 1 gm. p-toluenesulfonic acid were admixed with 200 cc. absolute benzene, and the resulting mixture was heated under reflux accompanied by stirring. The water liberated by the condensation reaction was collected in a water separator. The reaction had gone to completion after about 5 hours. The reaction mixture was allowed to cool to room temperature and was then shaken twice with 1 N NaOH. Subsequently, it was washed with water, dried over sodium sulfate and the benzene was distilled off under diminished pressure. The solid distillation residue was recrystallized from ethanol. 14.7 gm. 4-oxo-2-(α-bromo-isobutyl)-2,3-dihydro-(benzo-1,3-oxazine) were obtained. The product had the structural formula

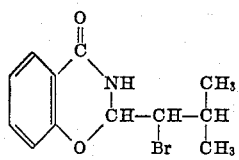

and a melting point of 142–144° C.

EXAMPLE 84

8.3 gm. salicylamide, 11.5 gm. α-bromo-heptanal and 1 gm. p-toluenesulfonic acid were admixed with 150 cc. absolute benzene, and the resulting mixture was heated under reflux accompanied by stirring. The water liberated by the condensation reaction was collected in a water separator. The reaction had gone to completion after about 2 hours. The reaction solution was extracted twice with 1 N NaOH and was then washed with water until free from alkali. After drying the solution over sodium sulfate, the benzene solvent was distilled off under diminished pressure. The oily distillation residue crystallized upon scratching and was recrystallized from ethanol. 7.5 gm. 4-oxo-2-(α-bromo-hexyl)-2,3-dihydro-(benzo-1,3-oxazine) were obtained. The product had the structural formula

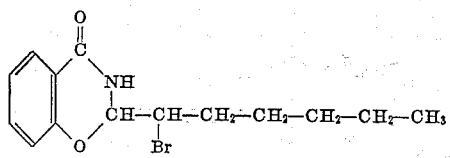

and a melting point of 133–135° C.

EXAMPLE 85

13 gm. 5-bromo-salicylamide, 11.5 gm. α-bromo-heptanal and 1 gm. p-toluenesulfonic acid were admixed with 150 cc. absolute benzene, and the resulting mixture was heated under reflux accompanied by stirring. The water liberated by the condensation reaction was collected in a water separator. The reaction had gone to completion after about 3 hours of refluxing. The reaction solution was extracted twice with 1 N NaOH and was thereafter washed with water until free from alkali and dried over sodium sulfate. The benzene solvent was distilled off and the distillation residue crystallized upon cooling. Upon recrystallization from ethanol, 8.2 gm. 6-bromo-4-oxo-2-(α-bromo-hexyl)-2,3-dihydro-(benzo-1,3-oxazine) were obtained. The product had the structural formula

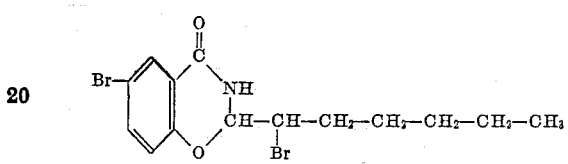

and a melting point of 111–112° C.

EXAMPLE 86

12 gm. 5-chloro-salicylamide, 13.6 gm. α-bromo-isobutyraldehyde and 1 gm. p-toluenesulfonic acid were admixed with 200 cc. absolute benzene, and the resulting mixture was heated under reflux accompanied by stirring. The water liberated by the condensation reaction was collected in a water separator. The reaction had gone to completion after about 3 hours of refluxing. The reaction solution was extracted twice with 1 N NaOH, washed with water until free from alkali and dried over sodium sulfate. The benzene solvent was then distilled off by vacuum distillation and the solid distillation residue was recrystallized from ethanol. 11.2 gm. 6-chloro-4-oxo-2-(α-bromo-isopropyl)-2,3-dihydro-(benzo-1,3-oxazine) were obtained. The product had the structural formula

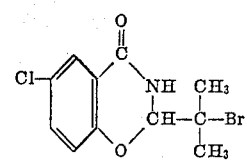

and a melting point of 133–134° C.

EXAMPLE 87

17.2 gm. 5-chloro-salicylamide, 10.6 gm. α-chloro-butyraldehyde and 1 gm. p-toluenesulfonic acid were admixed with 200 cc. absolute benzene, and the resulting mixture was heated under reflux accompanied by stirring. The water liberated by the condensation reaction was collected in a water separator. The reaction had gone to completion after about 4 hours of refluxing. The reaction solution was allowed to cool and was then shaken twice with 1 N NaOH and washed with water. After drying the solution over sodium sulfate, the benzene solvent was distilled off by vacuum distillation and the solid distillation residue was recrystallized twice from ethanol. 12.5 gm. 6-chloro-4-oxo-2-(α-chloro-propyl)-2,3-dihydro-(benzo-1,3-oxazine) were obtained. The product had the structural formula

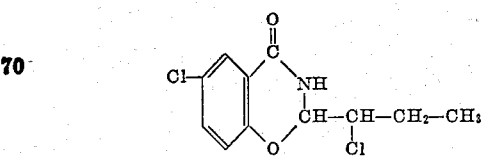

and a melting point of 112–113° C.

EXAMPLE 88

21.6 gm. 5-bromo-salicylamide, 10.6 gm. α-chlorobutyraldehyde and 1 gm. p-toluenesulfonic acid were admixed with 200 cc. absolute benzene, and the resulting mixture was heated under reflux accompanied by stirring. The water liberated by the condensation reaction was collected in a water separator. The reaction had gone to completion after about 3 hours of refluxing. The reaction solution was cooled and shaken twice with 1 N NaOH. Thereafter the solution was washed with water and dried over sodium sulfate, and the benzene solvent was distilled off by vacuum distillation. The solid distillation residue was washed with petroleum ether and then recrystallized from ethanol. 15.7 gm. 6-bromo-4-oxo-2-(α-chloro-propyl)-2,3-dihydro-(benzo-1,3-oxazine) were obtained. The product had the structural formula

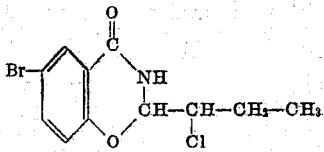

and a melting point of 145–146° C.

EXAMPLE 89

150 cc. glacial acetic acid were saturated with dry hydrogen bromide gas at a temperature from 5 to 10° C. 13.7 gm. salicylamide were added thereto and subsequently 7 gm. crotonaldehyde were added dropwise while passing additional hydrogen bromide gas through the solution. The reaction mixture was maintained at 50° C. for 30 minutes and was then allowed to cool to room temperature, whereupon it was poured into 1 liter of water. The precipitate formed thereby was separated and dissolved in ether. The ether solution was shaken twice with 1 N NaOH, washed with water and dried over sodium sulfate. The solvent was distilled off and the residue was recrystallized from ethyl acetate. 8.5 gm. 4-oxo-2-(β-bromo-propyl)-2,3-dihydro-(benzo-1,3-oxazine) were obtained. The product had the structural formula

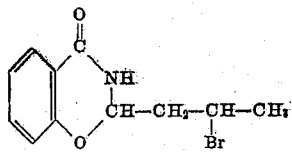

and a melting point of 113–114° C. (decomposition).

EXAMPLE 90

150 cc. glacial acetic acid were saturated with dry hydrogen chloride gas at a temperature of 5–10° C. 13.7 gm. salicylamide were added thereto and subsequently 7.7 gm. α-methyl-acrolein were added dropwise while continuing to pass hydrogen chloride gas through the solution. The reaction mixture was then maintained at 40° C. for 1 hour and was poured into 600 cc. water. The precipitate formed thereby was separated by vacuum filtration, stirred several times with 1 N NaOH, washed with water until free from alkali and recrystallized from ethanol. 16.6 gm. 4-oxo-2-(α-methyl-β-chloro-ethyl)-2,3-dihydro-(benzo-1,3-oxazine) were obtained. The product had the structural formula

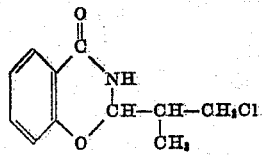

and a melting point of 118–119° C.

EXAMPLE 91

150 cc. glacial acetic acid were saturated with dry hydrogen chloride gas at a temperature of 5–10° C. 17.2 gm. 5-chloro-salicylamide were added thereto and subsequently 7.7 gm. α-methyl-acrolein were added dropwise while continuing to pass hydrogen chloride gas through the solution. The reaction mixture was then maintained at 60° C. for about 1 hour, allowed to cool to room temperature and thereafter poured into 600 cc. water. The precipitate formed thereby was separated by vacuum filtration, stirred with 1 N NaOH and washed with water until free from alkali. Upon recrystallization from ethanol, 13.7 gm. 6-chloro-4-oxo-2-(α-methyl-β-chloro-ethyl)-2,3-dihydro-(benzo-1,3-oxazine) were obtained. The product had the structural formula

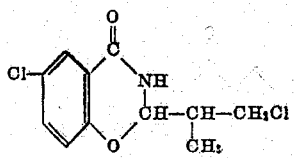

and a melting point of 138–140° C.

EXAMPLE 92

150 cc. glacial acetic acid were saturated with dry hydrogen chloride gas at a temperature of 5–10° C. 21.6 gm. 5-bromo-salicylamide were added thereto and subsequently 7.7 gm. α-methyl-acrolein were added dropwise while continuously passing hydrogen chloride gas through the solution. The reaction mixture was maintained at 60° C. for about 1 hour, allowed to cool to room temperature and then poured into 600 cc. water. The precipitate formed thereby was dissolved in chloroform, the solution was shaken twice with 1 N NaOH and finally washed with water until free from alkali. After drying the chloroform solution over sodium sulfate, the solvent was distilled off and the distillation residue was recrystallized from ethyl acetate. 17.2 gm. 6-bromo-4-oxo-2-(α-methyl-β-chloro-ethyl)-2,3-dihydro-(benzo-1,3-oxazine) were obtained. The product had the structural formula

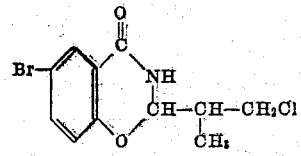

and a melting point of 139–141° C.

EXAMPLE 93

10.7 gm. salicylamide, 8.5 gm. γ-chlorobutyraldehyde and 1 gm. p-toluenesulfonic acid were admixed with 250 cc. absolute benzene, and the resulting mixture was heated under reflux for 3 hours accompanied by stirring. The water liberated by the condensation reaction was collected in a water separator. The reaction solution was allowed to cool and was shaken with 1 N NaOH. Thereafter it was washed with water until the wash water reacted neutral and was dried over sodium sulfate. The benzene solvent was distilled off and the distillation residue was recrystallized from 50% ethanol. 11.3 gm. 4-oxo-2-(γ-chloro-propyl)-2,3-dihydro-(benzo-1,3-oxazine) were obtained. The product had the structural formula

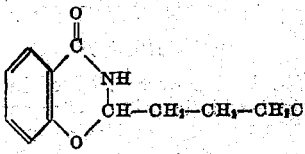

and a melting point of 82–84° C.

EXAMPLE 94

13.7 gm. salicylamide, 10.6 gm. α-chlorobutyraldehyde and 1 gm. p-toluenesulfonic acid were admixed with 200 cc. absolute benzene, and the resulting mixture was heated under reflux for 4 hours accompanied by stirring. The water liberated by the condensation reaction was collected in a water separator. After allowing the reaction mixture to cool, it was shaken with 1 N NaOH and washed with water until free from alkali. Thereafter it was dried over sodium sulfate and the solvent was removed by vacuum distillation. The distillation residue crystallized upon being stirred with ethyl acetate. After recrystallization from ethyl acetate, 13.8 gm. 4-oxo-2-(α-chloro-propyl)-2,3-dihydro-(benzo-1,3-oxazine) were obtained. The product had the structural formula

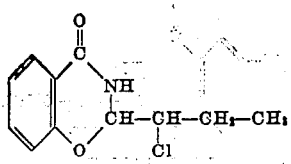

and a melting point of 70–71° C.

EXAMPLE 95

27.4 gm. salicylamide, 21.2 gm. α-chloroisobutyraldehyde and 1 gm. p-toluenesulfonic acid were admixed with 350 cc. absolute benzene, and the resulting mixture was heated under reflux for 4 hours accompanied by stirring. The water liberated by the condensation reaction was collected in a water separator. The reaction solution was allowed to cool and was then shaken twice with 1 N NaOH, washed with water until the wash water reacted neutral and dried over sodium sulfate. Thereafter the solvent was distilled off by vacuum distillation and the residue was recrystallized from 50% ethanol. 25 gm. 4-oxo-2-(α-chloroisopropyl)-2,3-dihydro-(benzo-1,3-oxazine) were obtained. The product had the structural formula

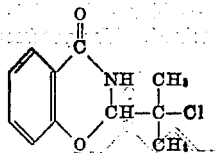

and a melting point of 107–108° C.

EXAMPLE 96

27.4 gm. salicylamide were dissolved in 270 cc. concentrated hydrochloric acid while applying heat to the acid. The solution was allowed to cool to 20–30° C. and 14.7 gm. crotonaldehyde were added thereto accompanied by vigorous stirring. After about 15 minutes the reaction mixture was diluted with 1.5 liters of water. After an additional 30 minutes, the crystalline reaction product was removed by vacuum filtration, washed with water and recrystallized from ethanol. 23 gm. 4-oxo-2-(β-chloro-propyl)2,3-dihydro-(benzo-1,3-oxazine) were obtained. The product had the structural formula

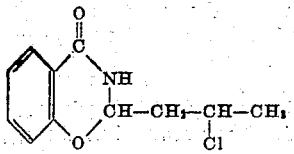

and a melting point of 124–125° C. (decomposition).

EXAMPLE 97

13.7 gm. salicylamide were dissolved in 200 cc. warm concentrated hydrochloric acid. After cooling the solution to 30–40°C., 10.6 gm. α-chloroisobutyraldehyde were added thereto accompanied by vigorous stirring, and stirring was continued for an additional 30 minutes. Thereafter the reaction mixture was diluted with 1.5 liters of water. The crystals precipitated thereby were removed by vacuum filtration, washed with 1 N NaOH and then with water and finally recrystallized from 50% ethanol. 9.3 gm. 4-oxo-2-(α-chloroisopropyl)-2,3-dihydro-(benzo-1,3-oxazine) were obtained. The product had the structural formula

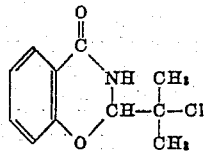

and a melting point of 107–108° C.

EXAMPLE 98

13.7 gm. salicylamide (0.1 mol) were suspended in 150 cc. glacial acetic acid and the suspension was saturated with dry hydrogen chloride gas. 8.4 gm. α-ethyl-acrolein were added to the suspension and the resulting mixture was maintained at 40° C. for about 1 hour while continuously passing hydrogen chloride gas therethrough. The reaction mixture was then poured into 500 cc. water, the solution was extracted with chloroform and the chloroform solution was shaken with 1 N NaOH, washed with water until free from alkali and dried over calcium chloride. Thereafter the chloroform solvent was removed by vacuum distillation and the distillation residue was recrystallized from ethanol. 8.7 gm. 4-oxo-2-(α-ethyl-β-chloro-ethyl)-2,3-dihydro-(benzo-1,3-oxazine) were obtained. The product had the structural formula

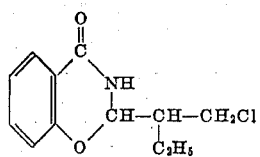

and a melting point of 124° C.

EXAMPLE 99

21.7 gm. 5-bromo-salicylamide (0.1 mol) were suspended in 150 cc. glacial acetic acid and the resulting suspension was saturated with dry hydrogen chloride gas. 8.4 gm. α-ethyl-acrolein (0.1 mol) were added to the suspension, and the resulting mixture was maintained for 45 minutes at 50–60° C. while continuously passing hydrogen chloride gas therethrough. The reaction solution was then poured into 500 cc. water and the precipitate formed thereby was stirred with 1 N NaOH, washed with water until free from alkali and recrystallized from methanol. 8 gm. 6-bromo-4-oxo-2-(α-ethyl-β-chloro-ethyl)-2,3-dihydro-(benzo-1,3-oxazine) were obtained. The product had the structural formula

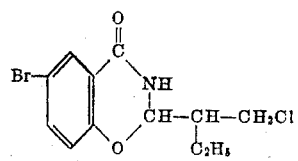

and a melting point of 136° C.

EXAMPLE 100

A suspension of 22.7 gm. 5-β-chloropropionyl-salicylamide in 150 cc. glacial acetic acid was saturated with dry hydrogen chloride gas. 6.2 gm. acrolein were added thereto and through the resulting mixture additional hydrogen chloride gas was passed for 20 minutes. The mixture was maintained at 50° C. for 30 minutes and was then poured into 1 liter of water. The precipitate formed thereby was separated by vacuum filtration and recrystallized twice from methyl-ethyl-ketone with addition of charcoal. 13.5 gm. 6-β-chloropropionyl-4-oxo-2-(β-chloroethyl)-2,3-dihydro-(benzo-1,3-oxazine) were obtained. The product had the structural formula

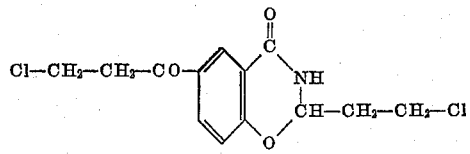

and a melting point of 184–186° C. (decomposition).

EXAMPLE 101

A suspension of 22.7 gm. 5-β-chloropropionyl-salicylamide in 150 cc. glacial acetic acid was saturated with dry hydrogen chloride gas. 7.7 gm. crotonaldehyde were added thereto and through the resulting mixture additional hydrogen chloride gas was passed for 20 minutes. The reaction mixture was maintained at 50° C. for 30 minutes and was then poured into 1 liter of water. The precipitate formed thereby was separated by vacuum filtration and after washing with water recrystallized from ethanol until the product gave no coloration with ferric chloride. 16 gm. 6-β-chloropropionyl-4-oxo-2-(β-chloropropyl)-2,3-dihydro-(benzo-1,3-oxazine) were obtained. The product had the structural formula

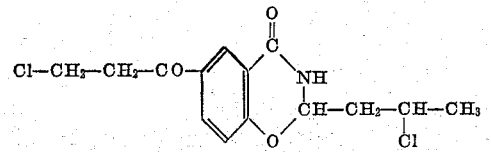

and a melting point of 176–178° C. (decomposition).

EXAMPLE 102

A suspension of 10 gm. 5-γ-chlorobutyryl-salicylamide in 75 cc. glacial actic acid was saturated with dry hydrogen chloride gas. 2.8 gm. acrolein were added thereto and the resulting mixture was heated at 60° C. while passing additional hydrogen chloride gas therethrough. After 50 minutes the mixture is allowed to cool and then poured into 600 cc. water. The precipitate formed thereby was collected on a filter, washed with water until neutral and recrystallized twice from ethanol. 4.7 gm. 6-γ-chlorobutyryl-4-oxo-2-(β-chloroethyl) - 2,3 - dihydro-(benzo-1,3-oxazine) were obtained. The product had the structural formula

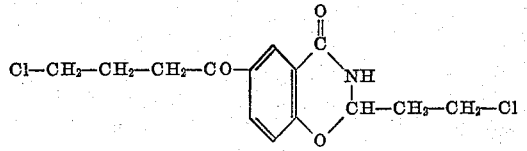

and a melting point of 169° C. (decomposition).

While we have illustrated the present invention with certain specific embodiments, it will be apparent to those skilled in the art that the invention is not limited to these embodiments and that various changes and modifications may be made without departing from the spirit of the invention or the scope of the appended claims.

We claim:

1. Compounds having the structural formula

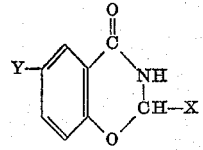

wherein Y is selected from the group consisting of hydrogen, halogen, lower alkanoyl, halo-lower alkanoyl, phenyl-lower alkanoyl and benzoyl, and X is selected from the group consisting of monohalo-alkyl with 1 to 6 carbon atoms and

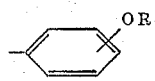

wherein R is selected from the group consisting of halo-lower alkyl, lower alkoxy-lower alkyl and lower alkenyl.

2. 4-oxo-2-(β-bromo-propyl)-2,3-dihydro(benzo-1,3-oxazine).

3. 4-oxo-2-(β-chloro-propyl) - 2,3-dihydro-(benzo-1,3-oxazine).

4. 4-oxo-2-(α-methyl-β-chloro-ethyl)-2,3-dihydro-(benzo-1,3-oxazine).

5. 4-oxo-2-(β-chloro-ethyl)-2,3-dihydro-(benzo-1,3-oxazine).

6. 6-acetyl-4-oxo-2-(β-chloro-ethyl)-2,3-dihydro - (benzo-1,3-oxazine).

7. 6-acetyl-4-oxo-2-chloromethyl-2,3-dihydro-(benzo-1, 3-oxazine).

8. 6-acetyl-4-oxo-2-(α-methyl-β-chloro-ethyl)-2,3-dihydro-(benzo-1,3-oxazine).

9. 4-oxo-2-chloromethyl-2,3-dihydro - (benzo - 1,3-oxazine).

10. 6-bromo-4-oxo-2-(p-[β-ethoxyethoxy]-phenyl)-2,3-dihydro-(benzo-1,3-oxazine).

11. 6-bromo-4-oxo-2-(p-[β-propoxyethoxy]-phenyl)-2,3-dihydro-(benzo-1,3-oxazine).

References Cited in the file of this patent

UNITED STATES PATENTS 2,776,281    Wright _____ Jan. 1, 1957

OTHER REFERENCES

Horrom: J. Am. Chem. Soc., vol. 72, p. 721 (1950).
Kaufmann: Chem. Abstracts, vol. 21 (1927), pp. 1866–7. (Abstracting Arch. Pharm., vol. 265 (1927), pp. 226–238.)